United States Patent [19]

Reischl et al.

[11] Patent Number: 4,843,105

[45] Date of Patent: Jun. 27, 1989

[54] PROCESS FOR THE PREPARATION OF FILLER-CONTAINING, ANTIONICALLY MODIFIED POLYURETHANE (UREA) COMPOSITIONS, THE POLYURETHANE (UREA) COMPOSITIONS SO-OBTAINED, AND THE USE THEREOF

[75] Inventors: Artur Reischl, Leverkusen; Kurt Mack, Wuppertal, both of Fed. Rep. of Germany

[73] Assignee: Bayer Aktiengesellschaft, Leverkusen, Fed. Rep. of Germany

[21] Appl. No.: 884,681

[22] Filed: Jul. 11, 1986

[30] Foreign Application Priority Data

Jul. 23, 1985 [DE] Fed. Rep. of Germany ....... 3526185

[51] Int. Cl.$^4$ .................... C08L 95/00; C08L 97/02; C08L 75/04; C08L 75/02
[52] U.S. Cl. .................... 521/54; 524/702; 524/705; 524/839; 521/101; 521/109.1; 435/182; 210/610
[58] Field of Search ................ 521/54, 101, 109.1; 524/839, 840, 702, 705; 435/182

[56] References Cited

U.S. PATENT DOCUMENTS

| | | | |
|---|---|---|---|
| 2,955,056 | 10/1960 | Knox | 117/98 |
| 3,114,772 | 12/1963 | Lorette et al. | 260/586 |
| 3,867,492 | 2/1975 | Dreotholm | 264/46.6 |
| 4,177,107 | 12/1979 | Kumakura et al. | 435/176 |
| 4,226,938 | 10/1980 | Yoshida et al. | 435/176 |
| 4,229,398 | 10/1980 | Harvey | 264/113 |
| 4,254,177 | 3/1981 | Fulmer | 428/256 |
| 4,315,996 | 2/1982 | Baatz et al. | 521/54 |
| 4,404,296 | 9/1983 | Schapel | 523/105 |
| 4,415,454 | 11/1983 | Fuchs | 210/616 |
| 4,419,261 | 12/1983 | Takahashi | 252/182 |
| 4,451,310 | 5/1984 | Lairloup | 156/78 |
| 4,576,718 | 3/1986 | Reischl | 435/182 |
| 4,608,397 | 8/1986 | Reischl | 435/180 |
| 4,634,672 | 1/1987 | Baumgarten | 435/182 |
| 4,681,851 | 7/1987 | Baumgarten | 435/182 |
| 4,734,439 | 3/1988 | Reischl | 521/54 |
| 4,742,095 | 3/1988 | Markusch | 524/840 |

FOREIGN PATENT DOCUMENTS 248354 11/1964 Austria .
1184857 4/1985 Canada .
0046901 10/1982 European Pat. Off. .
0046901 10/1982 European Pat. Off. .

(List continued on next page.)

OTHER PUBLICATIONS

Tanka et al., European Journal of Applied Microbiology & Biotechnology, vol. 7, 1979, pp. 351–354.
GWF-Wasser/Abwasser, vol. 124, 1983, pp. 233–239.
A. Bauer et al., Chemie Technik, vol. 6, 1982.
K. Fischer et al., GWF-Wasser/Abwasser, vol. 2, 1981, pp. 58–64.
A. E. Perrotti et al., Chemical Engineering Progress, vol. 69, No. 11, pp. 63–64, 1973.
G. Wysocki et al., CZ-Chemie-Technik, vol. 3, No. 6, 1974, pp. 205–208.
Third Report, "Adsorptive Abwasserreinigung", Oct. 1975, of Ausschuss Wasser und Abwasser (Water & Sewerage Board at VCIEV).

*Primary Examiner*—C. Warren Ivy
*Attorney, Agent, or Firm*—Gene Harsh; Joseph C. Gil

[57] ABSTRACT

The invention is directed to the formation of filler containing anionically modified polyurethane (urea) compositions by reacting suitable polyurethane (urea) forming ingredients in the presence of from 5 to 97% by weight of fillers selected from the group consisting of
 (i) finely divided or lumpy foam particles,
 (ii) fossile lignocelluloses,
 (iii) carbon powder, and
 (iv) mixtures thereof,
said filler-containing polyurethane (urea) having a water absorbability of from 33 to 97% by weight, and having an anionic group content of from 10 to 3000 milliequivalents of anionic groups and/or groups capable of anionic group formation per 1000 grams of said polyurethane (urea) components.

20 Claims, 2 Drawing Sheets

FOREIGN PATENT DOCUMENTS

| | | |
|---|---|---|
| 2347299 | 4/1975 | Fed. Rep. of Germany . |
| 2550818 | 5/1977 | Fed. Rep. of Germany . |
| 2929872 | 3/1981 | Fed. Rep. of Germany . |
| 2940260 | 4/1981 | Fed. Rep. of Germany . |
| 3025353 | 1/1982 | Fed. Rep. of Germany . |
| 3032869 | 3/1982 | Fed. Rep. of Germany . |
| 3120121 | 12/1982 | Fed. Rep. of Germany . |
| 3151925 | 7/1983 | Fed. Rep. of Germany . |
| 3312578 | 10/1984 | Fed. Rep. of Germany . |
| 1341717 | 9/1963 | France . |
| 1574789 | 6/1969 | France . |
| 1078202 | 8/1967 | United Kingdom ................ 524/840 |
| 1230573 | 5/1971 | United Kingdom . |
| 1278426 | 6/1972 | United Kingdom ................ 524/840 |
| 1307468 | 2/1973 | United Kingdom . |
| 1337413 | 11/1973 | United Kingdom . |
| 1390058 | 4/1975 | United Kingdom . |
| 1478000 | 6/1977 | United Kingdom . |
| 1540076 | 2/1979 | United Kingdom . |
| 1550465 | 8/1979 | United Kingdom . |

PROCESS FOR THE PREPARATION OF FILLER-CONTAINING, ANTIONICALLY MODIFIED POLYURETHANE (UREA) COMPOSITIONS, THE POLYURETHANE (UREA) COMPOSITIONS SO-OBTAINED, AND THE USE THEREOF

BACKGROUND OF THE INVENTION

Filler-containing polyurethanes with a high water absorption capacity in the form of aqueous polyurethane gels (hydrogels) have been disclosed in German Offenlegungsschrift 3,151,925, and wherein from 20 to 80% by weight of abrasives such as aluminum oxide, cerium oxide, tungsten dioxide, boron carbide, silicon carbide and asbestos powder with the optional addition of graphite, micro-glass beads, mica or short staple fibers and optionally also fungicides, dyes or coloring pigments are added. The materials are converted into elastic abrasive gels based on polyurethane (urea) by the reaction of hydrophilic isocyanate prepolymers (based on polyoxyalkylene ethers containing $\geq 30\%$ by weight of oxyethylene groups) with aqueous slurries of abrasive, which slurries may contain polyamine. The hydrophilic character of the gels is due to the use of hydrophilic (containing oxyethylene groups) polyether polyols as starting materials. The gels contain water in the form of polyurethanes swelled with water.

German Offenlegungsschrift 2,347,299 and 2,521,265 describe water-swelled polyurethane (urea) gels which may be either homogeneous or foamed with $CO_2$ and which may contain up to 50 percent by volume of fillers such as silicates, various types of silica, aluminium oxides, tin oxide, antimony trioxide, titanium dioxide, graphite and graphitized carbon, retort carbon, carbon black, pulverulent cements, color pigments, fibers and cellulose powders in addition to surface active agents and nutrients. The water absorption in the gels is due mainly to the use of hydrophilic polyether polyols containing $\geq 40\%$ by weight of oxyethylene sequences.

German Offenlegungsschrift 3,103,499 discloses substantially anhydrous polyurethane gel masses which contain polyols as dispersing agents and may contain active substances and possibly dyes, pigments, fibers, inorganic fillers, metal powders, active carbon, cellulose powder and silica preparations. Gels of this kind which contain polyol release at least a major proportion of the dispersed polyols when in aqueous suspension.

In the polyurethane gels known in the art, it is essential to synthesize hydrophilic polyurethanes based on polyethers with high ethylene oxide contents in order to obtain a sufficient water absorption capacity. This frequently gives rise to problems of (i) reactivity of the hydrophilic polyether polyols (which in most cases are highly reactive), (ii) of mechanical gel strength when highly hydrophilic polyether polyols are used, and (iii) high cost.

Numerous processes have already been described for impregnating foams and foam particles by steeping the foams in a reactive component such as polyisocyanates and subsequently reacting them with other reactants such as water, polyols, polyamines or diamine vapors. See, for example, the processes described in German Offenlegungsschriften 3,039,146 and 2,131,206; Japanese Patent 50-103,571; French Patents 1,587,855 and 1,574,789; and U.S. Pat. Nos. 2,955,056, 3,114,772 and 4,315,996.

Foams may also be subjected to a liquid which causes them to swell. They may then be exposed to polyurethane reactants, whereby it is possible to harden and rigidify the foam and substances may be incorporated in the swelled foam matrix, e.g. by the processes described in French Patents 1,341,717, 1,587,855 and 1,574,789 and German Auslegeschrift 1,911,645. Matrix foams of this kind have typical foam characteristics even though they may have a different rigidity or elasticity or different chemical or mechanical properties.

Numerous other patent specifications describe the bonding or pressing of foam particles (preferably waste particles of flexible polyurethane foam) with polyisocyanates, isocyanate prepolymers, polyols, polyamines, water or other reactants (optionally with the addition of cork, fibers, cellulose powder, flame retarding agents, pigments, metal powder or carbon black) to produce novel composite materials which may be provided with or welded to coverings, films or metal plates. Composite materials of this kind are used, for example, as insulating panels, linings, mattresses or molded articles. Suitable processes for obtaining such products are described, for example, in German Offenlegungsschriften 2,940,260, 3,213,610, 2,908,161, and 3,120,121; British Patents 1,337,413, 1.540,076; U.S. Pat. 4,254,177; and Japanese Patent 57/028,180.

The only process which has achieved any technical importance, however, is the production of composite block foam from size reduced polyurethane foam, 10 to 20% by weight of isocyanate compounds, up to about 10% by weight of fillers and small quantities of water. In this process, the filler consists mainly of color pigments used to impart a uniform color to the foam obtained from the various batches which may originally have differing colors. The water used in the preparation of the composite foam serves as a reactant to convert the polyisocyanate groups into polyurea groups with evolution of carbon dioxide. The quantity of water is calculated to correspond substantially to the stoichiometric requirement of the isocyanates but is at most used in only a relatively small excess since otherwise, the removal of moisture from the composite blocks (which are 40 to 60 cm in thickness) would give rise to difficulties.

In the field of (biological) waste water purification, many processes have already been proposed with the object of increasing the degradation effect so as to obtain purified water which is, as far as possible, free from harmful substances. The various processes which have been attempted include a process of oxidation of the noxious substances with increased oxygen supply to the activated sludge as well as special oxidation (processes such as treatment with ozone or hydrogen peroxide).

The catalytic oxidation of the contents of the waste water by means of air and with the addition of active charcoal followed by a precipitation has been recommended (see, e.g. German Patent 2,239,406; German Offenlegungsschrift 3,025,353; A. Bauer et al, Chemie Technik, Number 6, pages 3–9 (1982); K. Fischer et al, GWF-Wasser/Abwasser, Number 2, pages 58–64 (1981); R. E. Perrotti et al, Chemical Engineering Progress (CEP), Volume 69 (11), 63–64 (1973); G. Wysocki et al, ZC Chemie Technik, 3 (6), 205–208 (1974); and 3rd Report, "Adsorptive Abwasserreinigung" (October, 1975) of the "Ausschuss Wasser und Abwasser" (Water and Sewerage Board) at VCIeV.

The above-mentioned processes, however, were either found to be technically too complicated and expensive or the degradation effect was found to be insufficient. The numerous attempts to use active carbon for the purification of water have hitherto failed, in spite of the increased efficiency of decomposition, since the active carbon, even in a bound granulated form, was excessively size reduced by the very slight currents which inevitably occur in settling tanks from time to time, with the result that the carbon particles were discharged. Successful attempts to maintain a sufficiently large quantity of active carbon to be effective and to bind the active carbon sufficiently while maintaining the bioactivity in the settling tanks have not to date been successful.

German Offenlegungsschriften 3,032,882 (EP-A 46,900) and 3,032,869 (EP-A 46,901) describe the use of a macroporous substance having a low specific gravity (10 to 200 kg/m$^3$) as carrier material for nitrifying bacteria for use in activated sludge purification. These macroporous materials may be, for example, typical polyurethane foams. A similar use of such foam particles in a process and an apparatus for anaerobic biological waste water purification has also been described, see e.g. GWF-Wasser/Abwasser, 124 (1983), Number 5, pp. 233–239. Foams of this kind, however, float to the surface in open activated sludge tanks and give rise to various problems. Foam in the form of lumps based (inter alia) on polyurethanes have also been proposed for use in various special processes as bulk filling bodies (German Patent 2,839,872 and German Auslegeschrift 2,550,818) or a trickling filter mass (Austrian Patent 248,354) for biological waste water purification. The use of relatively abrasion resistant polyurethane (urea) foams having an open cell structure and a urea/urethane ratio below 5 as carrier medium for microbiologically active cells in waste water purification processes has been described in U.S. Pat. No. 4,503,150 which also mentions numerous other publications relevant to the state of the art describing the use of foams in biological waste water purification.

The use of polyurethane foam pieces as a filtration medium has been described in European Patent 77,411. In this process, the foam, when laden with dirt, is regenerated from time to time by a special process of rinsing.

The combination of microorganisms with surface active solids for increasing the activity of the microorganisms in bioconversion processes is also known. Thus, for example, German Offenlegungsschriften 2,633,259 and 2,703,834 describe the adsorption of cells on, for example, aluminium oxide, bentonites and SiO$_2$ and their subsequent embedding in polyacrylates. Furthermore, German Offenlegungsschrift 2,629,692 describes the incorporation of cells in photo-hardenable polyurethanes which contain photo-hardenable acrylate double bonds.

The embedding of viable cells in polyurethane hydrogels has also been disclosed; see, for example, Tanaka et al, European Journal of Applied Microbiology and Biotechnology, 7, (1979), page 371 et seq. Furthermore, a process for the preparation of hydrophilic biocatalysts in the form of gels or foams highly charged with enzymatically active substance by the inclusion of whole cells, cell fragments or enzymes is known. The biocatalysts are prepared by mixing an aqueous suspension of enzymatically active substance with hydrophilic polyisocyanates to form an enzymatically highly active, hydrophilic polyurethane network in the form of blocks or beads (see German Offenlegungsschrift 2,929,872). Further publications relative to this state of the art are mentioned in said Offenlegungsschrift, on page 7. The immobilization of microbial cells in polyurethane matrices (such as polyurethane foams or gels) has been described by J. Klein, and M. Klug in Biotechnology Letters, Vol. 3, No. 2, pages 65–90 (1981). Cationic, polymer-containing hydrophilic polyurethane gels incorporating viable cells have been described in German Offenlegungsschrift 3,312,578.

The preparation of polyurethanes containing enzymatically active substances is difficult, however, and has the disadvantage that the high reactivity of the isocyanate groups causes at least partial killing of the bacteria or cells or inactivation of enzymatically active material. The residual activities are as low as, for example, 7 to 48%. It is therefore not advantageous to incorporate living bacteria in the preparation of hydrophilic polyurethanes which are to be used for the purification of waste water. The quantity of bacteria which can be incorporated in this way is limited and a high proportion of the bacteria is inactivated by isocyanate reactions. Furthermore, the continuous preparation of active polyurethane masses containing bacteria and the storage of such polyurethane masses in a viable condition involves problems of manufacture and storage if the settling tanks (which generally have a capacity of several thousand cubic meters) are to be supplied with the required quantity and concentration of bacteria incorporated in the polymers. The capacity for growth of the bacteria would be drastically reduced even if the bacteria were incorporated in situ in the purification plant since they can only survive for a short time under the conditions of immobilization in the reaction medium.

The problem therefore remained to be solved of developing suitable methods for the preparation of carrier materials for use in new, economical and efficient processes for improved waste water purification.

It is therefore an object of the present invention to provide polyurethane (urea) compositions which have a high filler content and high water absorption capacity, which do not float to the surface in water and which would be suitable for use as carriers for biomasses in biological waste water purification.

DESCRIPTION OF THE INVENTION

Figure 1:
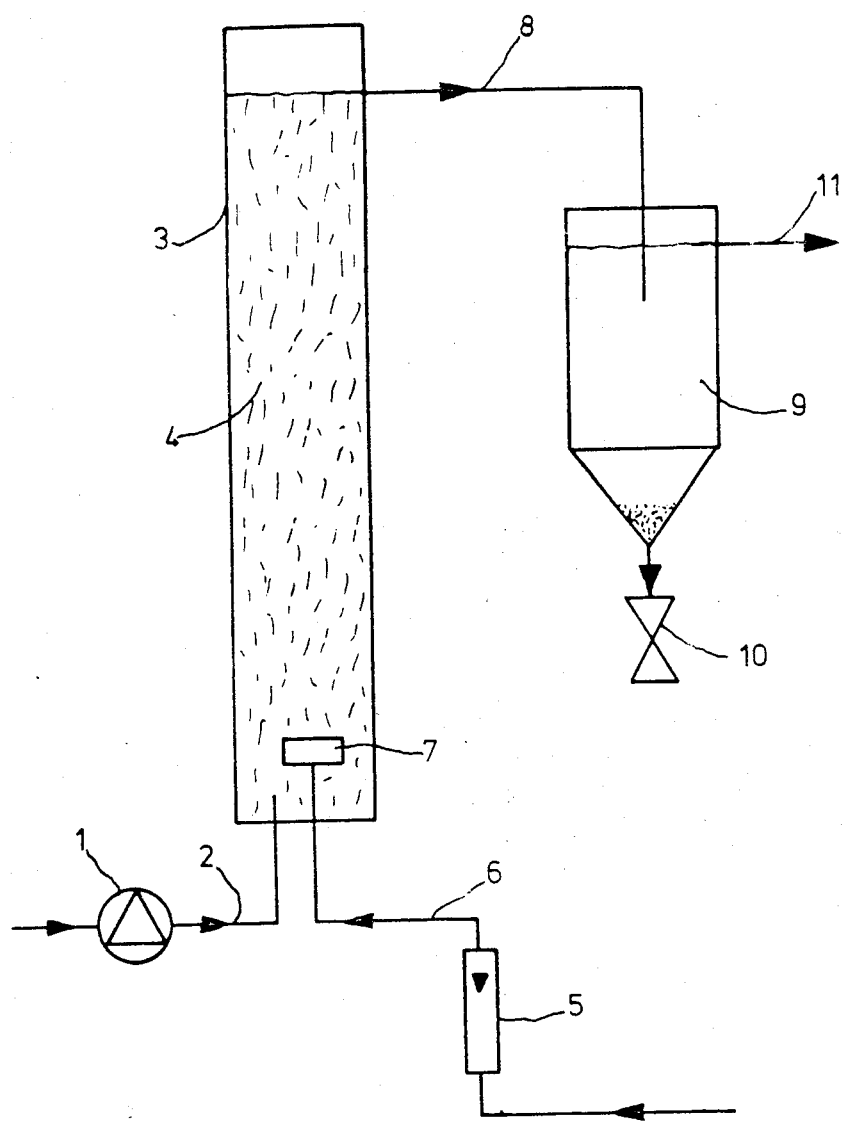
FIGS. 1 and 2 represent the schematics showing applications for the compositions of the present invention.

The present invention thus relates to a process for the preparation of filler-containing polyurethane (urea)s compositions from isocyanate prepolymers, fillers and water and optionally other substances serving as chain lengthening agents, comprising reacting (A) at least one di- and/or higher functional, isocyanate prepolymer (which may be either hydrophilic and/or hydrophobic), preferably having a functionality $\geq 2.1$ (most preferably $\geq 2.5$) and having an isocyanate content of from 1 to 12% by weight of NCO (preferably from 2.5 to 8% by weight), said prepolymers prepared by reacting (a) organic materials having two or more hydrogen atoms which are reactive with isocyanate groups (and which may be hydrophilic and/or hydrophobic), and having molecular weights of from 400 to 10,000, preferably polyhydroxyl compounds, and in particular polyfunctional polyether polyols having an overall functionality of $\geq 2.1$ (and most preferably $\geq 2.5$), (b) from 0 to 5 moles (preferably from 0 to 2 moles) per mole of (a), of materials having two or more hydrogen atoms which are reactive with isocyanate groups and having molecular weights of from 32 to 399, preferably from 62 to 254, (diols and/or polyols are preferred), (c) organic di- and/or polyisocyanates (preferably aromatic diisocyanates) in molar excess over (a), (b) and (d) and (d) optionally, at least one organic compound containing (i) either at least one hydrogen atom which is reactive with an isocyanate group or at least one isocyanate group and (ii) at least one anionic group or group capable of forming an anionic group (preferably diol- or diamino-sulphonates or diol-carboxylic acids or -carboxylates), the NCO-prepolymers being formed by partial or complete reaction of (a), (b) and (d) with (c), (B) from 0 to 50% by weight based on the weight of (A) of a lower molecular weight organic di- and/or polyisocyanate, with the mixture of (A) and (B) having an isocyanate group content of 30% by weight or less, (C) a stoichiometrically excess quantity of water, preferably at least 0.5 times and most preferably from at least twice to about 60 times the quantity of water, of components (A) and (B), and (D) from 0 to 50 equivalent % based on the total isocyanate equivalents in (A) and (B) of a member selected from the group consisting of (i) organic di- and/or polyamines, (ii) organic compounds containing at least one group which is reactive with an isocyanate group and at least one anionic group or group capable of forming an anionic group, (preferably aminosulphonic acids or aminocarboxylic acids, more particularly diaminosulphonic acids or diaminocarboxylic acids or the alkali metal or ammonium or amine salts thereof), and (iii) mixtures thereof, in the presence of (E) from 5 to 97% by weight, preferably from 5 to 95% by weight, more preferably from 15 to 95% by weight, and most preferably from 50 to 90% by weight, of fillers selected from the group consisting of (i) finely divided or lumpy foam particles, (ii) fossil lignocelluloses (preferably powdered lignite and finely divided peat), (iii) carbon powder (preferably active charcoal), and (iv) mixtures thereof, said % by weight of component (E) being based on the total moisture-free weight of components (A), (B), (D) and (E), said filler-containing polyurethane (urea) having a water-absorbability of from 33 to 97% by weight, and having an anionic group content of from 10 to 3000 milliequivalents of anionic groups and/or groups capable of anionic group formation per 1000 grams of components (A), (B) and (D).

It is also possible to conduct the reaction in the presence of further inorganic and/or organic fillers and conventional additives, catalysts and auxiliary agents used in polyurethane chemistry.

The highly water absorbent, filler-containing polyurethane (urea) masses are in a finely divided form, and are preferably in the form of lumps which have a high specific surface area and undergo a high degree of swelling and are abrasion resistant in aqueous media. Furthermore, the polyurethane (urea) masses preferably have an anionic group content of from 30 to 1,500 milli-equivalents and most preferably, from 50 to 750 milli-equivalents of anionic groups or groups capable of forming anionic groups per 1,000 g of components (A), (B) and (D). The anionic group content is derived from component (A)(d) and/or from component (D). Preferred are the polyamino sulphonates and/or polyamino carboxylates used as component (D).

The "in situ" incorporation of microorganisms in the polyurethane (ureas) of the present invention cannot be achieved without substantial loss of viable bacteria capable of propagation and severe reduction in the bioactivity, even when very careful and technically costly conditions are employed. The operating conditions should be carefully adjusted, especially as regards the temperature (about 10° C.). The in situ process is not preferred and in most cases not even necessary since biomasses easily grow into the polyurethane (urea) carrier masses of the invention.

The invention further relates to the highly water absorbent, anionically modified polyurethane (urea) masses containing filler which are obtainable by the process claimed, characterized in particular by a filler content of from 5 to 97% by weight, preferably from 5 to 95% by weight, and most preferably from 50 to 90% by weight, an anionic group content of from 30 to 1,500 milli-equivalents per kg and a water absorption capacity of from 30 to 97% by weight, and preferably from 50 to 95% by weight of water.

The fillers (E) consisting of foam and/or fossil lignocellulose powder (in particular lignite) and/or carbon powder are bound in a matrix of anionmodified polyurethane (urea). The polyurethane (ureas) are preferably in the form of a finely divided or flocculent or lumpy form with a high surface area and a high water absorption capacity. The high water absorption capacity is due mainly to the filler structure and is not usually determined by the hydrophilic and/or non-hydrophilic character of the polyurethane (urea) matrix. Although a hydrophilic polyurethane (urea) matrix (e.g. one based on polyether polyols containing 40% or more of oxyethylene groups) gives rise to a hydrophilic matrix, it is particularly preferred to use polyurethane (urea) masses in which the polyurethane (urea) matrix is built up from hydrophobic polyurethanes, e.g. on the basis of polyether polyols containing 20% or less of oxyethylene groups. In this case, the polyurethane matrix composition does not give rise to a hydrophilically swelled polyurethane matrix but only to a particularly favorable structural framework for the above-mentioned types of fillers.

It was a further object of the present invention to provide highly water absorbent carriers based on polyurethanes, which carriers would be abrasion resistant and mechanically resistant and reduced in cost due to the use of large quantities of surface active fillers and would not be limited in the choice of polyurethane-forming starting components to the sole use of highly hydrophilic polyether polyols. It was intended that these carriers should be suitable for various purposes, e.g. as carriers for waste water purification or biological fermentation.

The invention thus also relates to the use of the highly filled, highly water absorbent, anionically modified polyurethane (urea) carrier masses containing, as fillers, from 5 to 97% by weight, preferably $\geq 15$ up to 95% by weight, of foam particles and/or finely divided lignocelluloses (in particular lignite or peat) or carbon (such as active charcoal or carbonized lignite) and optionally other fillers, as carriers for biomasses which either are incorporated or, preferably, develop in the carriers, in waste water purification, and in particular biological waste water purification, and as carriers for biological fermentations.

The invention relates in particular to the use of the polyurethanes as carriers for biomasses for (preferably biological) waste water purification, characterized in that highly water absorbent, highly filled anionically modified polyurethane (urea)s masses obtainable by the process described above are used as carriers for biomasses in the clarifying liquid for waste water purification, said carriers preferably being used in a quantity of at least 0.5 g of dry mass of carrier per liter of clarifying liquid.

The masses according to the invention, serving as carriers readily suspended in water and optionally incorporating biomasses, may also be used in bioconversion processes for the production of organic compounds, or as carriers with a high water binding capacity for plant growth (optionally containing plant growth substances, fertilizers or seeds) or as filtration media or adsorbents for water insoluble liquids such as crude oil.

In the preparation of the compositions of the invention, various factors and their interaction are of great importance. This applies both to the starting components for polyurethane formation and the quantitative proportions in which they are used as well as the methods of preparation and the nature of the fillers. All these aspects are correctly adjusted to each other according to the invention to achieve the object of producing polyurethane (urea) carrier masses which combine high filler contents with the characteristics of high water absorption capacity, high abrasion resistance and a suitable structure for use in waste water purification.

(A) Isocyanate prepolymers

The isocyanate prepolymers (A) are prepared from the polyurethane-forming starting components known for this purpose. Relatively high molecular weight active hydrogen-containing materials (and preferably polyhydroxyl compounds) having molecular weights of from 400 to 10,000, preferably from 800 to 8,000, and melting points below 60° C. are used as component (A)(a). These may be difunctional and/or higher relatively high molecular weight polyols, which preferably have functionalities of 2.1 or more, most preferably 2.5 or more (and up to about 5).

Although the polyhydroxyl compounds used may be hydroxy polyethers, hydroxy polycarbonates or hydroxy polylactones, it is preferred to use hydroxy polyethers since they are much more resistant to hydrolysis even over long periods than polyhydroxyl compounds containing ester groups. The hydroxy polyethers used for synthesizing hydrophilic polyurethanes are hydroxy polyoxyalkylene ethers, which should suitably contain a relatively large number of oxyethylene sequences, amounting, for example, to more than 20% by weight but less than 85% by weight. The oxyethylene groups may be built into the polyethers in end positions or statistically distributed or, preferably, in the form of segments or both in end positions and in segments (in the interior). The polyoxyalkylene ethers may, however, also contain small quantities of, for example, cycloaliphatic or aromatic groups, for example if they have been started on cycloaliphatic polyols or aromatic compounds such as dihydroxy cyclohexanes or hydroquinonebis-hydroxy ethyl ethers or 4,4'-dihydroxy-diphenyl-dimethyl methane. Suitable polyols may also be synthesized by the alkoxylation of relatively high-functional sugar alcohols or sugars.

It is preferred to use hydrophobic polyethers for producing the prepolymer, e.g. polyoxypropylene polyols containing little or no oxyethylene segments (e.g. $\leq 20\%$ by weight). It is surprisingly found that these may be used for building up highly water absorbent carrier systems using polyurethane foam particles and/or lignite or peat. These carrier systems in most cases even have a substantially higher long term stability in aqueous bio-conversion media. When coal dust, carbon black or active charcoal alone is used, the filled polyurethanes obtained have substantially lower water absorption capacity values if they do not at the same time contain relatively large quantities of foam particles.

The polyethers based on propylene oxide adducts are the preferred polyethers according to the invention although the polyethers may also be based on other alkyl oxiranes in the usual manner, e.g. on epichlorohydrin, epoxybutanes or mixtures thereof with, for example, propylene oxide. Hydrophobic polypropylene glycols are also found to be very suitable for the purpose of this invention.

Polyether containing amino end groups also constitute suitable starting materials, e.g. the polyethers with aliphatic amino end groups obtainable by pressure amination of the secondary hydroxyl groups or cyanoethylation followed by reduction of aliphatic or, preferably, aromatic amines obtained by alkali metal hydrolysis of isocyanate prepolymers.

The relatively high molecular weight compounds (A)(a) may also contain up to 40% by weight of relatively high molecular weight polyaddition products obtained, for example, from hydrazine hydrate and tolylene diisocyanate or they may be so-called polymer polyols containing up to 40% by weight of copolymers, or graft (co)polymers based on acrylonitrile, butadiene and (meth)acrylic esters.

Low molecular weight, divalent and/or higher valent compounds (A)(b) having molecular weights of from 32 to 399, preferably 62 to 254, may also be used in preparing the prepolymer. These are preferably diols and/or polyols or amino alcohols. Examples include ethylene glycol; 1,2-propylene glycol; 1,4-butanediol; 2,3-butanediol; neopentyl glycol; 2-methyl-1,3-propanediol; 1,6-hexanediol; and 1,12-dodecanediol; the relatively hydrophilic di-, tri-, tetra- and higher molecular weight polyethylene glycols with molecular weights of up to 399; di-, tri- and tetra-propylene glycol diols and di-, tri- and tetra-oxymethylene diols. Suitable amino alcohols include, for example, bis-hydroxy ethylamine, bis-2-hydroxy propylamine, amino sugar and 2-amino-1,3-propanediol.

The quantity of (b) may range from zero to about 5 moles of (b) per mole of (a). Trifunctional polyols may be incorporated to control the overall functionality of the isocyanate prepolymers.

According to the invention, anionic groups or groups which form anionic groups can be incorporated in the hydrophilic and/or hydrophobic prepolymer (component (A)(d)). The quantity of anionic groups or groups giving rise to anionic groups which are to be incorporated may range from 10 to 3,000 milli-equivalents of anions or anion-forming groups to 1,000 g of the polyurethane matrix solids content (free from filler). The upper limit is generally 3,000 milli-equivalents per 1,000 g of solid substance because problems would otherwise arise due to lowering of the long term storage stability in water. The quantity of anionic or anion-forming groups incorporated is preferably from 30 to 1,500 milli-equivalents and most preferably from 50 to 750 milli-equivalents of anionic or anion- forming groups per 1,000 g of polyurethane solids content.

The polyurethane components containing or giving rise to anionic groups should have (i) either at least one isocyanate group or at least one isocyanate reactive group, e.g. OH, a primary or secondary amino group, a hydrazide group, hydrazine group or oxime group and (ii) at least one anionic group or group capable of forming an anionic group. The anionic groups are preferably sulphonate or carboxylate groups or an equivalent form of anionic groups or the sulphonic acid or carboxylic acid derivatives which are optionally subsequently converted into the sulphonate or carboxylate groups by reaction with bases. Suitable bases for this purpose include, for example, alkali metal hydroxides, alkali metal carbonates, ammonia or primary or secondary and preferably tertiary amines. Examples of suitable anion-forming groups include anhydride groups or ester groups (less preferred) which must first be converted into the free carboxylic acids or sulphonic acids by saponification and into the appropriate carboxylates or sulphonates.

Isocyanate carboxylic acids and isocyanate sulphonic acids are also suitable starting components containing anionic groups.

The anionic starting components (d) used at the prepolymer stage preferably contain hydroxyl groups or aromatic amino groups as the isocyanate reactive groups, e.g. 2,2'-dihydroxy methyl-propionic acid; tartaric acid; malic acid; β-hydroxypropionic acid; lactic acid; 4-amino-anthranilic acid; diols carrying sulphonate groups, such as HO—CH$_2$—CH$_2$—CH(SO$_3$-Na)—CH$_2$—OH; and products of alkoxylation of the last-mentioned disulphonate with 1 to 4 moles of ethylene oxide and/or propylene oxide.

Incorporation of the amino or polyamino sulphonate or carboxylate compounds is generally not carried out at the prepolymer stage but preferably at the chain lengthening stage (at the stage of reaction with water) (i.e., component (D)).

Other suitable compounds containing hydroxyl groups and carboxylic acids capable of salt formation include, for example, glycolic acid, mucic acid, glyceric-boric acid, salicylic acid, hydroquinone-2,5-dicarboxylic acid, p-hydroxy-isophthalic acid, 4,6-dihydroxy-isophthalic acid, 2,8-dihydroxy naphthoic acid and dimethylol propionic acid.

Introduction of the anionic groups is in most cases carried out by reacting components containing the corresponding salts of the anionic groups, such as sulphonates or carboxylates, in admixture with the component (a) in the reaction with the polyisocyanates (c), optionally with the addition of water. Alternatively, however, free acids such as dimethylol propionic acid may be incorporated in the prepolymer. This may be followed by salt formation by the addition of aqueous alkali, alkali metal carbonates or amines during the subsequent chain lengthening reaction to produce the high molecular weight polyurethane urea.

Alkoxylated diol sulphonates may also be included for incorporation in the isocyanate prepolymer, e.g. diol-sulphonates corresponding to the formula:

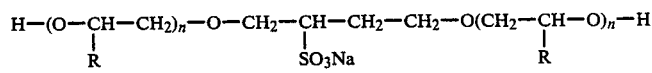

wherein R=H or methyl and n denotes an integer from 1 to 4.

The alkoxylated diol sulphonate salt is soluble in polyol.

The anionic components mentioned above for synthesizing the polyurethane may be added at the stage of prepolymer formation as solutions in inert organic solvents, optionally with the addition of water. The salt form may be obtained from the free acid or from the anion-forming groups such as esters by subsequent treatment, e.g. with alkali metal hydroxides or amines.

Additional anionic polyurethane starting components will be mentioned hereinafter under (D) since they are less suitably used at the isocyanate prepolymer stage than at the chain lengthening stage.

Anionic modification need not necessarily be carried out on the isocyanate prepolymer but may be carried out subsequently during the chain lengthening reaction, provided the quantities of anionic groups or groups suitable for anion formation mentioned above are introduced into the polyurethane urea at one of the stages.

The polyisocyanates (A)(c) used are di- and polyfunctional polyisocyanates such as, e.g., hexanediisocyanate; dicyclohexyl methane diisocyanate or isophorone diisocyanate; preferably aromatic di- and polyisocyanates such as the tolylene diisocyanate isomers; diphenylmethane-4,4'- and/or 2,4'- and/or 2,2'-isomers; relatively high molecular weight polyphenyl-polymethylene polyisocyanates which are formed by the phosgenation of crude formaldehyde/aniline condensation products (polyamine mixtures) optionally in an undistilled form; and the like. Polyisocyanates containing sulphone groups may also be used as hydrophilic polyisocyanates.

Any known polyisocyanates, however, may be used as polyisocyanate components for the reaction, for example those described in some detail in German Offenlegungsschrift 2,832,253. The last-mentioned Offenlegungsschrift also gives further examples of reactants (a) and (b). Further examples of anionic, salt-forming reactants (d) are given in German Offenlegungsschrift 2,550,797.

The reactive components (a), (b) and (d) are reacted with excess quantities of di- and/or polyisocyanates by the usual methods to form isocyanate prepolymers (A) having isocyanate contents of from 2 to 12% by weight, preferably from 2.5 to 8% by weight, and most preferably from 2.5 to 6% by weight, e.g. by heating all the components together at 50° to 100° C. until isocyanate prepolymer formation has been achieved, whereas not necessarily complete reaction must have been achieved, but preferably the isocyanate content is less than 25% above the calculated value of the NCO-prepolymer.

The total functionality of the isocyanate prepolymers (A) should be at least 2.1, and preferably 2.5 or more which means that at least one of the components (a), (b), (c) and/or (d) must have a functionality greater than 2.

These isocyanate prepolymers (A) are optionally mixed with further quantities of low molecular weight polyisocyanates (B) in quantities of up to half the proportion by weight of (A) and until mixtures of (A) and (B) have isocyanate contents of 30% by weight or less, preferably 20% by weight or less. The polyisocyanates for prepolymer formation (c) and the additional polyisocyanates (B) used to increase the isocyanate content may differ from one another, but if the same polyisocyanates are used then a correspondingly high proportion of polyisocyanates (c) may already be used at the stage of prepolymer formation (A). When such mixtures with a high isocyanate content are used, an appropriate additional quantity, for example of polyether polyols or of polyether polyurethane prepolymers containing OH end groups, may be used for the preparation of the polyurethane (urea)s with high filler content.

Under certain conditions, all the starting components used for the preparation of the isocyanate prepolymer may be added together for a fully continuous production of the highly filled, anionically modified carrier masses of the invention. Thus, separate preparation of isocyanate prepolymer and interim storage is not essential. For this "in situ" preparation of the prepolymer, it has been found sufficient to react in particular the low molecular or relatively high molecular weight polyols, more particularly the preferred polyether polyols, and optionally other chain lengthening agents for a short time (e.g. about 10 to 60 seconds) with the preferred aromatic di- and polyisocyanates in a continuous flow mixer at elevated temperatures of from 50° to 120° C., preferably from 80° to 100° C., until the reaction has been taken to an advanced stage.

If, after this short time, the isocyanate content is less than 50%, preferably less than 25% above the calculated value for the isocyanate prepolymer reaction, then this incomplete isocyanate prepolymer formation does not have a disadvantageous effect on the properties of the masses prepared. At the same time, this procedure is of great advantage for a fully continuous production method, in particular if the isocyanate prepolymers produced have a limited length of life or undergo a considerable increase in viscosity during storage. Isocyanate prepolymers which manifest these characteristics include, for example, those which contain certain quantities of compounds containing tertiary amino groups, e.g. diols or triols containing tertiary amines.

The reaction of the isocyanate prepolymers (A) or (A)+(B) is carried out with far greater than stoichiometric quantities of water (C) in a hetero disperse system. The quantity of water—or a part therefrom—is preferably used for dispersing the fillers or stirring them up into a paste. The quantity of water is in practice substantially limited to 2 to 60 times the stoichiometric quantity but may be 2 to 3 times higher.

The isocyanate prepolymers are then added, optionally already with certain quantities of water. The isocyanate prepolymers generally thoroughly wet the fillers and envelop them and then harden relatively slowly with water (more rapidly if a certain proportion of diamines or polyamines is added) to form the polyurethane (urea) matrix. The reaction with water can be shortened to a few minutes or even seconds by increasing the reaction temperature.

The chain lengthening reaction with water is preferably carried out with the addition of polyurethane starting components containing anionic groups or groups which form anionic groups (D)(ii) in particular compounds containing sulphonate and/or carboxylate groups and amino or hydrazine or hydrazide groups. The compounds used for this purpose are in particular diaminosulphonates, diaminodisulphonates or diaminocarboxylates, e.g. aliphatic diaminosulphonates such as

(x=1 to 3, A=alklai metal cation, e.g. lithium, sodium, potassium or tertiary amines) aromatic diaminomono- or dicarboxylic acids;

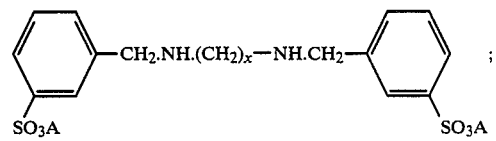

hydrazine sulphonic acid (or salts thereof; or aliphatic diaminocarboxylates such as

Apart from these preferred compounds, however, there may also be used mono- or diaminocarboxylic acids such as, for example, glycine, β-alanine, 6-aminocaproic acid, 4-aminobenzoic acid, 3,4-diaminobenzoic acid or lysine or lysine-monomethyl ester. Further examples include amino- or diamino-sulphonic acids such as sulphanilic acid; naphthylamino sulphonic acid; 4,4'-diamino-diphenyl-disulphonic acid; and 2,2'- or 4,4'-diamino-diphenylether-sulphonic acid-(2). The following are further examples of hydroxycarboxylic acids: dimethylol propionic acid, glycolic acid and 4,6-dihydroxy-isophthalic acid.

The anion groups in the highly filled polyurethane ureas have an advantageous influence not only on the binding of the fillers but also on their abrasion resistance. Furthermore, the ionic charges ensure fine dispersion or even solution of the isocyanate compounds in the water which is used in very large stoichiometric excesses (a sort of emulsifying action), thereby preventing unwanted coagulation of the polyurethanes and ensuring that the particles of filler become very uniformly enveloped by the (anionic) polyurethane urea which is formed from the isocyanate prepolymers (A) in the water. The isocyanate prepolymers are preferably dispersed in the water and will deposit on the filler particles.

The anionic groups can be introduced with the above-mentioned amino carboxylates or amino sulphonates (preferably in their salt form) not only by way of the isocyanate prepolymers but also by way of the chain lengthening reaction in water. This is a simple, easily controlled reaction taking place in the aqueous phase in which most of the filler is already dispersed.

According to one particular embodiment of the process, the anionic polyurethane urea masses may contain cation groups or groups capable of cation formation so that the carrier masses have an ampholytic character, i.e. they contain both cationic and anionic groups. According to the invention, however, the anion content predominates, i.e. the end product contains a higher proportion of negatively charged ions than positively charged ions. The quantity of anionic groups described is to be understood as the difference between the quantity of any cationic groups present and quantity of anionic groups.

Cation formation is generally carried out by the usual methods employed in polyurethane chemistry. The cationic groups used may in principle be quaternary or salt type ammonium groups or sulphonium or phosphonium groups. It is preferred to use compounds containing quaternary ammonium groups or tertiary amino groups which are subsequently converted into the ammonium or salt form. The cationic groups or cation-forming groups are incorporated in quantities less than those of the anionic groups in quantities of from 10 to 3,000 milliequivalents of cations or cation-forming compounds to 1,000 parts by weight of polyurethane solids content. In cases where quaternized compounds or compounds converted into a salt form are used, the upper limit is generally 1,000 milli-equivalents per 1,000 g of solids because the reaction would otherwise be accompanied by a troublesome increase in viscosity. The quantity of cationic groups or cation-forming groups incorporated is preferably from 30 to 750 milli-equivalents of cationic or cation-forming groups, most preferably from 50 to 750 milli-equivalents of cationic or cation-forming groups, to 1,000 g of polyurethane solids.

The cation-forming compounds used are preferably diols or polyols containing tertiary amino groups, e.g. N-methyl-di-(ethanol)amine or -(propanol)amine; N,N-dimethyl-aminomethyl-propanediol-(1,3); or bis-hydroxyethyl-piperazine. Higher functional compounds such as triethanolamaine or relatively high molecular weight compounds may also be used, e.g. polyoxyalkylene ethers which have been started on tertiary amino polyols, e.g. of the type mentioned above. Other such tertiary amine compounds which can be incorporated are described, for example, in German Patent 3,461,102 or in Austrian Patent 257,170. Quaternized compounds much as tetramethyl ammonium chloride or tetramethyl ammonium methyl sulphonate may also be used for incorporation but in some cases it is sufficient to incorporate compounds which give rise to tertiary amino end groups, e.g. N,N-dimethyl-aminoethanol.

When lignite powder is used as all or part of the filler, the desired product may be obtained preferably by the polyaddition of isocyanate prepolymers containing tertiary nitrogen, and chain extender compounds containing anionic groups. The polyurethane urea carrier masses then obtained react with the acid groups of the filler, for example, humic acids, to be converted into the partially ampholytic form. By this humate formation (with the humic acids of the peat), the solubility of the humic acids in water is at the same time reduced or even eliminated.

Anionic polyurethane (urea) masses containing cationic groups or groups capable of cation formation are most suitably prepared by way of isocyanate prepolymers containing cationic groups or groups capable of cation formation such as nitrogen bound in a tertiary form and anionic groups containing or anionic groups forming chain extending agents. Phosphoric acid salts may also be used for salt formation and constitute, for example, a growth component for bacteria in sewage sludge. In many cases, however, salt formation with the humic acids or other acid constituents of the sewage sludge is sufficient, in which case cation formation only takes place in the settling tanks.

The fillers (E) are essential constituents of the water absorbent polyurethane urea masses. The unexpectedly high water absorption capacity as well as the high decomposition effect of the carriers used according to the invention are brought about by an interaction between the fillers and the polyurethane urea masses. Either the polyurethanes (e.g. in the form of a hydrophilic polyurethane matrix) and/or (preferably) the hydrophilic or cellular fillers (e.g. lignite or black peat and/or foams) produce the hydrophilic character, i.e. the water absorption capacity in the carriers.

The preferred fillers are homogeneous or cellular plastics of various kinds, but in particular prefinished polyurethane foam particles or rigid or semi-rigid polyurethane foam granulates or powder.

The use of cellular plastics is of particular economic interest, especially plastics in the form of flexible polyurethane foam waste which is commercially formed in enormous quantities. Such foam waste (preferably polyether-based) may be used as filler in the form of an inexpensively obtainable granulate composed of regularly or irregularly shaped lumps with an edge length varying from a few mm to several cm, (preferably 2 mm to 5 cm), optionally as a mixture of various foams having different bulk densities. The foam particles incorporated in the matrix preferably have bulk densities of about 10 to 110 kg/m$^3$. Flexible polyurethane foams are preferably used in the form of lumps whereas rigid, brittle polyurethane particles are preferably used in powder form. It is surprisingly found, however, that even flexible foam waste in the form of floccules having an average density below 23 kg/m$^3$ are eminently suitable for use as carriers for growing biomasses when coated with the polyurethane ureas. The foams may be used also in cubus or polyhedric form with even, convex or concave areas or with edges, which are of equal or different length. The cavities in the foams are almost completely or at least partially filled or covered when the foams are blended with the anionic matrix so that the density and the mechanical strength increase sufficiently to ensure that the foam floccules no longer float to the surface and are permanently resistant to mechanical forces.

Fossil lignocelluloses and naturally occurring materials containing their secondary products, such as in particular lignite, can also be used alone or together with the other fillers according to the invention. Due to their high water binding capacity, these lignocelluloses and the natural products containing their derivatives also yield highly water absorbent carriers when combined with the anionic polyurethane masses. Prefinished foam particles and/or the fossil lignocelluloses (in particular powdered lignite) are therefore the preferred fillers in the process according to the invention. Lignite is a particularly advantageous hydrophilic filler and is particularly preferred as filler for the invention.

Lignite is capable of binding large quantities of water hydrophilically without the material feeling wet. For example, it is capable of binding more than 150% of water in this way, based on the weight of dry lignite substance. In addition, lignite provides advantageous topological conditions for the production or porous carrier masses particularly suitable for use as carriers for biological waste water purification.

In fossil deposits such as the lignite area of Aachen, the lignite has an average water content of about 60% by weight. The proportion of water soluble constituents in this naturally occurring form of lignite is so high that it would seem unsuitable to use this lignite directly as filler in the process according to the invention. It is advisble to reduce the proportion of water soluble compounds in the lignite. This can be achieved most simply by subjecting the water-containing lignite to a drying process to reduce the water content at least to below 20% by weight, and preferably below 10% by weight. Progressive reduction of the natural moisture content and increase in the drying temperature and time occurring in a tempering process are accompanied by conversion and condensation reactions with an increase in molecular size, with the result that the water solubility of the humic acids undergoes a sharp change and the brown discoloration of water in which a sample of lignite is suspended, for example, is reduced. At the end of this drying process, the lignite is substantially more suitable as filler for the preferred use according to the invention in polyurethane urea carrier masses in an aqueous medium and is therefore particularly preferred.

Another method of reducing the proportion of soluble compounds in lignite consists of a chemical treatment, for example with excess quantities of isocyanate compounds. The reactive groups of the lignite, which may still be slightly moist, react with the di- and polyisocyanates, which may be monomers or polymers. This reaction is also accompanied by an increase in molecular size. At the same time envelopment with polyurea accompanied by evolution of carbon dioxide takes place in the presence of residual moisture. The two methods, tempering with reduction and/or removal of moisture and treatment of the lignite with polyisocyanate, are most simply carried out together in the process of production of the polyurethane urea carrier masses.

Furthermore, it has surprisingly been shown that when carriers containing lignite which is bound with anionic polyurethane ureas are used as carrier masses for bacteria in waste water purification, they are still suitable for this purpose if water soluble residues, such as humic acid impurities or compounds which cause yellow discoloration, are left to bleed out over a short period. This is due to the fact that the carrier masses according to the invention provide such a substantial improvement in the biological purification of waste water (in particular when the concentration of noxious substances is increased) that soluble components derived from the lignite do not even appear in the first portions of discharge of the biological purification stages obtained during the starting period after the carrier masses have been put into use.

Peat is known to contain considerably larger quantities of water soluble constituents than lignite, even causing dark brown discoloration of the water. In the case of peat, it is therefore particularly important to apply the measures described above in order to achieve a drastic reduction in solubility, especially when the carrier material is to be used for the preferred purpose of the invention of microbial conversion processes.

Black peat is basically more suitable than white peat. The greater part of the water contained in black peat (based on the naturally occurring material) is removed in an initial tempering process so that the residual moisture content is as far as possible reduced to a value distinctly below 20% by weight, based on the total quantity. If the substantially de-watered black peat is subjected to a polyurea modification with low molecular weight or relatively high molecular weight di-or polyisocyanates at temperatures of, say, 70° C. to 110° C., a further substantial reduction in the water soluble constituents is also obtained. It is preferred to use aromatic di- and polyisocyanates in a quantity resulting in a reaction of 0.5 to 2.5 kg of black peat, based on the weight of dry mass, per isocyanate equivalent (i.e. 42 g of isocyanate groups).

For producing the anionic polyurethane urea carrier masses in the process according to the invention, the black peat is preferably used in this modified form. An exception may be made, however, if, for example, the polyurethane urea masses are to be used in horticulture as carrier material for seeds which are to develop into seedlings. When used for this purpose, the bleeding out of water soluble compounds from peat is of no significance.

In the process for producing the polyurethane urea masses, various forms of carbon such as pit coal, finely ground coal dust, charcoal or lignite coke, may be used, but these forms of carbon are preferably used according to the invention only as components to be mixed with the above-mentioned foam and/or lignocellulose fillers.

Apart from the above-mentioned fillers, finely divided distillation residues melting above 100° C. may also be used, in particular distillation residues obtained from the distillation of tolylene diisocyanate, for example by introduction of the distillation residues into water, accompanied by de-naturization and followed by granulation. These TDI residues may, if desired, subsequently be modified by a treatment with compounds containing reactive hydrogen, such as ammonia, polyols or polyamino compounds. In many cases, they still contain small quantities of included isocyanate groups or reactive conversion products of isocyanates which are capable of reacting with the biomasses or with compounds which are to be degraded or decomposed. Distillation residues of this kind are described, for example, in German Offenlegungschriften 2,846,814, 2,846,809 and 2,846,815.

Other suitable distillation residues include the high melting distillation residues of amines, phenols, caprolactam, and the like.

Homogeneous and cellular polymer plastics obtained from vinyl and/or divinyl compounds in size reduced form, in particular polymer plastics waste, may be used or included as fillers, especially as mixing components.

Inorganic fillers such as quartz, sea sand, pyrogenic silica (aerosil), silicates, aluminosilicates, bentonites, aluminium oxide, pumice stone, silica sols, water glass, calcium oxide, calcium carbonate, heavy spar, gypsum, iron(II) and/or iron(III) oxides and especially also finely divided, optionally magnetic oxides such as magnetite, cobalt oxides, barium ferrites, iron powder or $\gamma Fe_2O_3$ in pigment form are preferably only used in limited proportions in addition to the fossil lignocelluloses and/or foam fillers. These inorganic fillers are added to adjust the specific gravity of the carriers to a certain extent so that these carriers will sink or float but never rise to the surface of the liquid to be clarified. Exceptionally finely divided inorganic fillers (e.g. containing primary particles below 10 $\mu$m and having a high specific surface area, e.g. aerosil or iron oxides) present in the carriers used according to the invention promote the transfer of oxygen to the bacteria in the sewage sludge and hence improve the degradation efficiency or performance. Metal oxides obviously are particularly advantageous in their specific oxygen transfer function and therefore provide advantageous degradation effects according to the invention. Fibers (e.g. inorganic fibers) such as glass fibers or natural or synthetic fibers (e.g. cotton dust) may also be used as modifying filler additives.

The average particle size of the fillers is generally from 0.1 to 1,000 μm, preferably below 300 μm and most preferably below 100 μm. For active carbon and inorganic constituents as well as for coal dust or charcoal powder, it is preferred to use smaller particle sizes than for peat or finely divided lignite, both of which may contain fibrous components several mm in length.

The foam particles which may be used as fillers are not limited in their particle size. Particles of foam measuring several mm (e.g. 1 to 30, preferably 2 to 10 mm) or even foam films about 2 to 10 mm in thickness can be coated with the polyurethane (urea) matrix.

The total filler content should be above 5% by weight, preferably above 15% by weight, most preferably above 40% by weight, with an upper limit of 97% by weight, and preferably 95% by weight. The proportion of filler is calculated in percent by weight based on the moisture free content of components (A), (B), (D) and (E). The upper limit is generally that at which the filled polyurethane mass will still hold together and be sufficiently abrasion resistant although in certain cases it may be possible to increase the filler content even further, e.g. to 98% or even 99%, if biological clarification is to be carried out in a fixed bed arrangement.

Anionic polyurethane mass carriers containing filler combinations of fossil lignocelluloses, in particular powdered lignite (and optionally carbon powders) and/or polyurethane foam particles (preferably flexible polyurethane foam waste particles) are particularly preferred. The most advantageous properties are obtained with a combination of polyurethane foam particles and lignite. The fillers used in addition to the above-mentioned preferred fillers, such as inorganic filler or distillation residues and others already mentioned, are preferably used in quantities of less than 20% by weight.

The foam particles and lignite, which is a preferred filler, may be mixed in any proportions although proportions in the range of 1:10 to 10:1, particularly from 1:5 to 5:1, are preferred.

Incorporation of the fillers in the polyurethane (urea) matrix may be carried out by various methods. For example, they may be mixed with one of the starting materials for the prepolymer (e.g., a hydroxyl-functional, relatively high molecular weight polyol) or with the prepolymer itself. The polyurethane (urea)-forming reaction may then be carried out with the mixture obtained. Preferably, however, the fillers are first wetted with water or dispersed in water and bound by the addition of the isocyanate prepolymers while at the same time polyurethane (urea) formation takes place (in particular by means of water as chain lengthening agent). When the anionic isocyanate prepolymers are used, it is advantageous to mix the components briefly with a proportion of the water provided, for example in a continuous flow mixer or a static mixer, in order to produce a very finely divided emulsion which enables even fairly thoroughly predried fossil celluloses to be immediately mixed with the total quantity of water so that the isocyanate reaction can take place under conditions of optimum distribution.

Any of the various types of substances conventionally used in polyurethane chemistry may be employed as additives and/or auxiliaries, e.g. stabilizers, UV absorbers, dispersing agents, emulsifiers, silicone derivatives, dyes and pigments. Any of the conventional polyurethane catalysts may be used, e.g. tertiary amines or metal catalysts (e.g. tin catalysts) although catalysts are in many cases not essential.

When highly hydrophilic isocyanate prepolymers are used, the hydrophilic polyurethane (urea) carriers containing fillers such as lignite are present in the form of a more or less gelatinous, swelled and possibly closed celled gel which has a moist feel.

Highly hydrophilic isocyanate prepolymers are most suitably used in combination with a granulate of prefinished flexible polyurethane foam (waste) based on a hydrophobic polyether, with or without other filler, because the cell structure of the prefinished flexible foam particles substantially increases their resistance in water, especially under hydrodynamic stresses, and the cell structure remains open.

Another advantageous combination consists of highly hydrophilic polyethers (polyether polyols) or their isocyanate prepolymers with hydrophobic polyethers or their isocyanate prepolymers. Depending on the proportions in which these components are mixed, the highly hydrophilic polyethers accelerate the isocyanate reactions in the preparation of the polyurethane (urea) carrier masses according to the invention even when the highly hydrophilic polyether component is used in a quantity of only 5 to 10% by weight, based on the total quantity of polyether, without at the same time resulting in any loss of water resistance.

Open celled, anionic polyurethane urea masses with a high filler content may also be obtained without the addition of prefinished polyurethane foam if at least part of the polyether polyol is a hydrophobic polyether polyol, for example if the hydrophobic polyether component amounts to at least 15 to 30% by weight, based on the total quantity of polyether (i.e. if 70 to 85% by weight of highly hydrophilic polyether is used). The polyurethane urea starting components are preferably rendered hydrophobic in segments and this form of hydrophobicizing can be more easily adjusted to the required properties or conditions than a statistical distribution of the ethylene oxide groups in a given type of polyether.

Carrier masses based on hydrophobic isocyanate prepolymers, on the other hand, have a dry feel and thereby differ markedly from the gel-like products. They have good abrasion resistance and surprisingly high water absorption capacity (WAF) values. Furthermore, in contrast to gels, they may be directly obtained in the form of small lumps suitable for use and can be kept in water for a period of years without any signs of degradation or decomposition. They are therefore preferred.

If a suitable continuously operating mixing apparatus is used, such as a double paddle screw trough, all the components may be introduced virtually simultaneously or within only a few seconds of one another and vigorously mixed together so that the isocyanate reaction sets in immediately. The reaction velocity may be influenced in known manner by means of catalysts and/or the application of elevated temperatures. The temperatures employed at the beginning of the isocyanate reaction are in the range of from 10° to 90° C., preferably from 20° to 70° C., and ordinary room temperature is in many cases quite suitable. When all the reactants have finally been vigorously mixed together, the reaction temperature may be raised to 90°–95° C.

Water is not only a necessary reactant for the polyisocyanate compounds, as already mentioned above, but is also used in considerable excess to serve as dispersing agent, regardless of whether the isocyanate prepolymers used are hydrophilic or hydrophobic. Particularly important characteristics of the end product (i.e. of the highly filled polyurethane (urea) carrier) is its resulting water absorption capacity and water retention capacity as well as the abrasion resistance of this hydrophilic (water absorbent) carrier. In addition, the carrier particles are stable over a period of years and are insoluble in the clarification water. They have a slight tendency to sink or at least they keep afloat in the settling tank without rising to the surface. The individual particles in suspension do not stick together.

Maximum water absorption capacity may be achieved by using large quantities of highly hydrophilic materials. For example, if polyols are used as polyurethane (urea) starting materials they should contain, say, more than 30% of polyoxyethylene groups. Similarly, hydrophilic chain lengthening agents and highly hydrophilic fillers will lead to the same effect. If the polyurethane (urea) matrix is too highly hydrophilic, however, it will in most cases be insufficiently abrasion resistant in a fluidized bed and insufficiently stable for long term storage in water.

The water absorption capacity of the carriers to be used according to the invention may be achieved by various methods of preparation and by using various compositions, but the general rule may be applied that hydrophilic polyurethanes may be combined both with hydrophilic and with hydrophobic fillers but if hydrophobic polyurethanes are used as a matrix they are most suitably combined with highly hydrophilic fillers such as lignite and/or with polyurethane (flexible) foams in order that the carriers may have the required water absorption capacity. Furthermore, the anion content of the products according to the invention also increases the hydrophilic character of the product.

The quantity of water present in the reaction with the isocyanate prepolymers and fillers is also of major importance and must be adjusted within the limits claimed for the process by carrying out simple preliminary tests.

When a relatively small excess of water is used, e.g. 20 parts of water to 80 parts of isocyanate prepolymer plus fillers, the product obtained (e.g. when a hydrophobic isocyanate prepolymer is used) consists of a finely powdered or crumbly substance which is insufficiently hydrophilic and therefore unsuitable. It is only with a substantially larger quantity of water (e.g. from 33% by weight upwards) that the isocyanate prepolymer binds the fillers to form an abrasion resistant, water absorbent carrier having the required properties according to the invention.

Polyurethane foam, like the other fillers, is generally mixed with the prepolymer in a large excess of water. The quantity of water employed is in most cases a multiple, frequently 1 to 10 times the quantity by weight of foam. The surface active filler most commonly and preferably used in addition, such as finely divided lignite, optionally together with other fillers, e.g. $<20\%$ by weight of inorganic fillers, is distributed surprisingly uniformly on and in the foam cells when mixed in simple mixing apparatus and is bound in an abrasion resistant form in the water-swollen polyurethane phase by means of the isocyanate reaction. In the resulting polyurethane (urea) masses having a high filler content, the flexible polyurethane foam waste which may, for example, be used as filler and which has an average density of only 23 $kg/m^3$ is completely altered by comparison with its original structure and physical properties. It is only by the fundamental modification to the polyurethane ureas that it becomes suitable for use according to the invention. The cavities in the foam, which in most cases are partly filled, are capable of binding a sufficient quantity of water to enable (flexible) foam pieces to be used as fillers in combination with both hydrophobic and hydrophilic polyurethane reactants, preferably with isocyanate prepolymers and preferably with additional hydrophilic fillers (lignite). The interaction between hydrophilic fillers (preferably lignite) and the physically bound water results in an advantageous structure which enables bacteria to grow into the remaining cavities of the modified foam. Inorganic fillers in a highly divided form may be used to regulate the specific gravity in the preparation of these highly filled polyurethane (urea) masses, so that the specific gravity can be adjusted to the necessary value for the clarification liquid and, if required, the transfer of oxygen to the bacteria can also be facilitated.

The shape imparted to the highly filled polyurethane (urea)s during their preparation may vary widely and is adjusted to the particular process employed in any of the given clarification plants which differ widely in their mode of operation. Regularly or irregularly shaped, lumpy "granulate" (when not obtained directly) may be obtained indirectly from blocks, strands or tapes by the usual cutting or granulating techniques. In special cases, the highly filled polyurethane (urea)s used according to the invention are suspended in settling tanks in the form of films or wound in spirals. In such cases, textile supports may be applied by known casting or spread coating processes to stabilize particularly large surfaces. Those films or spirals will then form by the surface-coating (or surface modification) of preformed foams which have been cut to film or spiral form.

In the most inexpensive and simplest form of biological waste water purification, the carriers are used in the form of an irregular granulate measuring from 0.1 to 10 cm, preferably 0.5 to 5 cm. In most cases the desired lumped form of the polyurethane (urea) carries forms directly, since this lumped form is dependent from the original form of any foam particles used as fillers. Any fine powder formed in the process can be washed out and removed if necessary.

When foam granulates and additional fillers are used, the isocyanate reactions are carried out in kneaders or in mixing apparatus equipped with tools in the form of plough shares so that no subsequent size reduction is necessary.

The hydrophilic carriers according to the invention which have undergone swelling in water generally constitute soft-elastics, abrasion resistant particles which have a more or less moist feel (in the case of hydrophilic polyurethanes) or a dry feel (in the case of hydrophobic polyurethanes). These particles can be suspended in water, in which they slowly sink.

It was not to be foreseen that the anionically modified polyurethane (urea) masses containing high proportions of fillers such as lignite and optionally also foams would be able to be produced in a sufficiently abrasion resistant form as highly hydrophilic carriers with a homogeneous structure and would be capable of exerting such an advantageous influence on biological clarification in spite of the fact that the active fillers (such as lignite) were embedded within the polyurethane mass and that the biomass of the bacteria were initially in the outer, coherent, aqueous phase and developed from there.

The carriers used according to the invention are suitable for most of the conventional processes for biological, aerobic or anaerobic clarification of waste water both in industrial and in municipal clarification plants.

The biological conversion of organic impurities into $CO_2$ and water and in some cases also nitrates by means of bacteria under conditions of oxygen supply in bacterial masses consisting predominantly of carbohydrates and proteins is referred to as aerobic waste water purification.

The conversion of organic impurities, particularly carbohydrates, proteins and fats without the supply of oxygen, by means of acid forming bacteria, sulphate-reducing bacteria and methane-producing bacteria forming hydrogen sulphide, carbon dioxide and in particular methane is referred to as anaerobic waste water purification.

The highly filled, highly water absorbent, anionically modified polyurethane masses according to the invention used as carriers improve the biological purification of waste water both in a stationary and, preferably in a moving state. It is particularly surprising to find that these carriers also have an advantageous effect on waste water which has a very low concentration of noxious substances, e.g. below 500 mg/l. This characteristic is highly important for the final stage of purification in clarification plants to ensure the discharge of highly purified water.

The purification according to the invention may therefore be carried out in the first and/or in subsequent activated stages by supplying the carrier to any part of one or more combined activated sludge tanks. Since the polyurethane (urea) masses according to the invention are highly abrasion resistant in water in spite of their relatively low polyurethane content, they may be used both in highly turbulent clarification tanks and in containers in which the sewage sludge is stationary or only slightly moving, i.e. the highly filled polyurethane (urea) masses may be used in both fluidized bed and flowing and fixed bed arrangements.

In aerobic clarification processes, the introduction of air and/or (pure) oxygen gives rise to vigorous turbulence. As a result, the highly filled polyurethane masses and the activated sludge are kept in vigorous motion in a so-called liquid fluidized bed. In spite of this turbulence, a layer of bacteria which has an unexpectedly powerful purifying action, develops on the surface and partly also in the interior of the highly filled polyurethane. The filler incorporated in the polyurethane contributes in numerous respects to the improved purifying action. Depending on the nature of the fillers and the nature of the polyurethane matrix, the mechanical strength and the hydrophilic character of the polyurethane are improved. In addition, the capacity for biological assimilation of the organic substances dissolved in the waste water is substantially increased. At the same time, the filler or filler mixture bound in the anionic polyurethane act as a regulator for maintaining the specific gravities of the water permeable carriers at an optimum value so that carriers which have a slight tendency to sink can be kept uniformly distributed or a floating state can be maintained in the usual, highly filled activated sludge tanks which are about 4 to 12 meters in height. This is particularly important and may even be a precondition for most of the biological clarification plants used by the communities or in industry.

In one special embodiment of the invention, as already mentioned above, the polyurethane (urea) masses and their fillers and optional additives are adjusted so that they sink in the activated sludge tank of the clarification plant either immediately or within a few hours. Furthermore, in spite of a copious supply of air and oxygen, these carrier materials (together with the biomass which adheres to them in considerable quantities) after a certain time, form a fluidized or fixed bed through which oxygenated gas flows and at the top of which is a supernatent layer of water free from polyurethane. The nature of this bed can be modified if required (e.g. for the occasional or continuous removal of excess sludge) by altering the rate at which gas is passed through. Even under these conditions, the highly filled, hydrophilic polyurethane (urea) masses used according to the invention are not lost.

In addition to the widely used aerobic biological purification of waste water, anaerobic waste water purification has acquired considerable technical importance, especially for waste water having a high carbohydrate content such as that found, for example, in the food industry or cellulose industry. The anionic polyurethane urea carrier masses prepared and used according to the invention are eminently capable of dealing with even very high biological concentrations of noxious substances, amounting to over 25,000 mg/l, in a single stage of waste water purification. They are also capable of eliminating organic chlorine compounds which were hitherto virtually undergradable. In some cases, a combination of anaerobic and aerobic biological waste water purification is particularly effective. For such cases also it is advantageous to use the highly filled hydrophilic polyurethane (urea) carriers according to the invention.

The degree to which the highly filled polyurethane (urea) masses according to the invention are hydrophilic is preferably adjusted so that the absorption of a large quantity of water accompanied with considerable swelling takes place within a matter of hours or a few days. Alternatively, a considerable quantity of water may already be present as a disperse phase in the course of preparation of the polyurethane masses so that the carrier is already completely swelled. Both in anaerobic clarification and in aerobic waste water purification, the products according to the invention can readily release considerable quantities of gaseous products such as carbonic acid, methane or hydrogen sulphide.

As already mentioned above, the "in situ" incorporation of microorganisms in polyurethanes or other plastics for the biomasses used in waste water purification is virtually impossible to achieve without any loss of bacteria which are capable of propagating and without a considerable loss in bioactivity. Moreover, such incorporation is unnecessary when the carriers according to the invention are used since it is found, surprisingly, that a high proportion of the bacterial cultures are firmly held in the highly filled polyurethane (urea) carriers, even in a fluidized bed, and are capable of penetrating these hydrophilic, readily swelling polyurethane masses and are thus protected against mechanical damage. The bacteria are found to be seated in the locality where the highly filled polyurethane (urea)s have an increased concentration of dissolved noxious substances due to adsorption.

The efficiency of degradation and purification (i.e. the improvement in the quality of purified waste water obtainable by the process according to the invention) is not confined to a marked reduction in the chemical oxygen requirement (CSB value) but also promotes a drastic reduction in the toxicity for daphnia and fish. In addition, the noxious odor frequently found in clarification plants is to a large extent eliminated. The clarified water is considerably lighter in color and the capacity of a given biological clarification plant can be considerably increased.

The highly filled polyurethane (urea) masses used as carriers according to the invention very decisively improve the efficiency of purification of biological clarification plants in two respects. The carriers are not only capable of concentrating the contents of waste water in general on their surface but they are also capable of having a specific action on certain substances present in the waste water, e.g. chlorinated hydrocarbons such as ethylene chloride, which they are capable of concentrating. The substrate concentration of such compounds is thus raised to the level necessary for biological degradation. At the same time, microorganisms settle on the highly filled carriers and undergo optimal propagation due to the sufficiently enriched substrate. Adsorption surfaces for the organic compounds at low concentrations present in the waste water, are released after conversion by bacteria. The processes of adsorption and utilization of dissolved waste water contents on the carriers on which the microorganisms have developed proceed continuously. A state of equilibrium is established between adsorption and concentration of the substances dissolved in the water and the biological degradation by the microorganisms which have settled on the surface of the carriers. The surface is thereby continuously regenerated. At the same time, an equilibrium is established, depending on the amount of substrate available, between the growth of biomasses on the highly filled polyurethane (urea) masses and the elimination of the substances. An increased biomass activity is thus maintained on the carriers.

The activated sludge concentration in biological clarification plants can be considerably increased by means of the carriers according to the invention. In most cases it can be at least doubled so that the capacity of existing clarification plants can thus be considerably increased or smaller tank volumes can be used in new plants.

A simple method of using the carriers consists of adding them to a conventional biological activated tank. The particles of carrier are kept suspended by the stream of gas/liquid and become uniformly distributed in the activated space. Due to their extremely high abrasion resistance, the highly filled polyurethane carriers are also suitable for use in activated tanks equipped with surface ventilators.

The use of these carriers is particularly advantageous in the nitrification or denitrification of waste water since the microorganisms required for this purpose grow slowly, and preferentially on growth surfaces.

For aerobic waste water purification, these plants may also be operated as fluidized bed reactors or fixed bed reactors. The flow through the fixed bed may be either from below upwards or from above downwards. They may also be used as trickling filters. The highly filled polyurethane masses are also advantageously used as growth surfaces (immersion percolating filter) due to their exceptional large surface area.

The plants using the carriers herein may be used both in a fluidized or flowing bed form or in a fixed bed form. In a fixed bed operation, the highly filled anionic polyurethane masses may be used as granulates or as fixed installations, e.g. in the form of unrolled mats or prefinished inserts. Here again, the flow through the fixed bed may be either from below upwards or conversely. The mode of operation will generally be chosen according to the nature and particular characteristics of the waste water.

The highly filled polyurethane (urea) carriers are capable of efficiently removing noxious substances from water which has undergone a conventional preliminary biological purification, even when these noxious substances contain a very high proportion of difficultly degradable organic residues which microorganisms are no longer capable of breaking down in a conventional biological installation due to the high degree of dilution, the slow rate of propagation of the microorganisms and the risk of the residues being flushed out.

The carriers according to the invention are also capable of removing organic constituents from waste air, e.g. from the waste air of clarification plants or the waste air of production processes for producing organic compounds. This waste air purification may be carried out by sucking the air through the carriers once or several times or bringing the air into contact with the highly filled polyurethane urea carriers which should be moist or wet or suspended in water. Exhaust air may be introduced (e.g. from above) into and pass through one or more columns arranged in series which are packed with the polyurethane urea carrier masses, compressed to a packing of 50 to 80 volumes percent, and optionally containing suitable suspensions of microorganisms for biological degradation. Water may be trickled through the columns at the same time. A high rate of biological elimination of organic noxious substances takes place after an initial dwell time of about 5 to 60 seconds and leads within a relatively short period to a vigorous propagation of the degrading microorganisms. This economically efficient process resembles the process using aqueous suspensions in that adsorption of the noxious substances and their degradation take place simultaneously and in the same location in a physical-biological equilibrium on and in the carrier mass in the presence of a film of moisture. The excess of additional microorganisms developed may be removed by occasionally filling the bioreactor columns once or several times with water and vigorously blowing air through the columns.

Disposal of the carrier masses used according to the invention poses no problems since they are inert. Thus, for example, in clarification plants in which the excess of activated sludge is burned in a fluidized bed furnace, carrier masses used over a relatively long period, e.g. a year, may be discharged with the excess sludge and burned with it as a source of energy. In general, however, it is not necessary to replace the whole carrier material.

Another important utilization of the carriers consists of their use for bacteria or enzymes in bioconversion processes for the preparation of complicated organic compounds. The carriers in the form of separate pieces can easily be removed from the reaction vapors or fermentation vapors by filtration. The carriers can be used, for example, for the process of preparing citric acid from starch, for the hydrolysis of penicillin G by means of acylases to produce 6-amino-penicillanic acid, for the preparation of stereospecific, biologically active compounds, or for the fermentation of sugar-containing liquors in the beet-sugar industry.

The carriers may also be used as soil improvers or special growth promoting carriers of a hydrophilic nature for facilitating the rooting of plants since they may contain any plant nutrients, have a water content which can be utilized over a very long period, may contain plant fertilizer and easily reabsorb water. In the course of preparation of the carrier masses, seeds may be added which may subsequently be brought to germination, and the carrier masses with germinating seeds may be used, for example, in the form of trays such as parsley trays or as small pieces of carriers with seedlings.

The carriers in the form of small pieces may also be used in water as filtration medium for finely divided impurities and may be regenerated, for example by rinsing with water. The carriers according to the invention are particularly effective as adsorbents for (crude) oil or other organic liquids which are not water soluble.

The most important use for the lumped anionic carriers of the invention lies in the aerobic or anaerobic treatment of waste water and also in the mitrification or denitrification of waste water. Here the relatively slow growing nitrifying or denitrifying biomasses (bacteria) are effectively held by the carrier masses and will not be washed out.

Characterization of the anionic, filler-containing polyurethane urea masses

Excess water is added to the carrier material obtained (which may have been granulated) and the material is left for 24 hours (at room temperature) to swell to its full extent. Supernatant water is decanted. The value obtained, which gives the percent by weight of water in and between the swollen carrier is known as the water absorbability (WAF).

In the case of Example 1, the solids content of the aqueous suspension of granulate obtained in the form of a highly swelled carrier material amounts to 96 g of solid content per liter of "suspension" (without supernatant water).

The solids content in one liter of such a suspension (without supernatant water) is referred to as the dry substance of the suspension (abbreviated TS-S).

The weight of one liter of this suspension of the highly swelled carrier material (without supernatant water) is referred to as suspension weight (abbreviated SG).

The so-called suspension factor (F4) is calculated from the suspension weight (SG) and the dry substance of the suspension (TS-S) contained therein. The value of the suspension factor F4 minus 1 (F4−1) indicates how many times its own quantity of water (based on the dry substance of carrier) is contained in the suspension (as swelling water and as water in the gaps in or between the particles of carrier).

In practice, the suspension factor F4 is determined by measuring the dry substance of the suspension. The suspension weight of the suspension (SG) is divided by the dry substance of the suspension (TS-S) contained therein:

$$F4 = \frac{SG}{TS - S}$$

From this suspension factor F4 it is possible to calculate the water absorbability (WAF) as a characteristic of the carrier masses in accordance with the following formula:

$$WAF = \frac{F4 \text{ minus } 1}{F4} \cdot 100; \text{ (in \% by weight)}$$

This value for water absorbability (WAF) expressed in % by weight is a clear indication of the state of the highly swelled carrier masses. In Example 1, for example, the dry substance of the suspension amounts to 96 g of solid substance. When the suspension weight is 1015 g liter, the suspension factor obtained F4=1015/96=10.6

One part by weight of dry substance of the carrier composition is thus converted into the swelled form of suspension using 9.6 times its quantity of water. In other words, the water absorbability is calculated to be 9.6 divided by 10.6 multiplied by 100=90.3%.

To further characterize the carrier composition, various apparent densities are determined as follows:

S1: Apparent density, drained off: The carrier mass is suspended in a large excess of water for 24 hours. A screen having screen apertures measuring 2 mm is then filled with the swelled mass to a height of 10 cm and the mass is left to drip for 1 hour. The substance left in the screen is weighed in a measuring vessel and the weight obtained is converted to the apparent density per liter.

S2: Apparent density, crushed out: After the water has been left to drip off the carrier mass as described under S1, the mass is put under a pressure of 3 bar in a 1 mm aperture screen for 5 minutes and weighed in a measuring vessel. The apparent density S2 per liter is then calculated.

S3: Apparent density, dried: The moist carrier mass of S2 dried for (about) 1 day at 100° C. under vacuum until a constant weight is obtained and the mass is then weighed in a measuring vessel as above.

In Example 1, the values obtained for S1 to S3 are as follows:

S1: 515 g/l,
S2: 503 g/l,
S3: 239 g/l.

The following factors can also be determined:

F1: The volume factor is the quotient of the apparent weight density, drained off (S1) and the dry substance of the suspension (TS-S).

$$F1 = \frac{S1}{TS - S}$$

F2: The crush factor is the quotient of the apparent density, crushed out (S2) and the dry substance of the suspension (TS-S).

$$F2 = \frac{S2}{TS - S}$$

F3: The swelling factor is the quotient obtained from the apparent density, drained off (S1) and the weight of dry mass (TS(S1)) obtained from the dripped sample after complete removal of water.

$$F3 = \frac{S1}{TS(S1)}$$

The volume, crush and swelling factors should be at least 2, preferably at least 3, and most preferably at least 4. The upper limits of these factors are slightly below 20, preferably below 15. Furthermore, the three factors of a given sample should not differ too greatly, i.e. any one factor should not be more than 3 times and preferably not more than twice another factor.

In the examples, the chemical oxygen requirements were determined according to DIN 38409—part 41 (December, 1980), the fish toxicity according to DIN 38412—part 15 (June, 1982), the daphnia toxicity according to DIN 38412—part 11 (October, 1982) and the odor threshold value according to the German standard process for water investigation, loose-leaf collection, edition 1982 published by Verlag Chemie-Weinheim.

EXAMPLES OF EMBODIMENTS (A) General Procedure for the Preparation of Carrier Masses (A1a) Preparation of the isocyanate prepolymers, discontinuous process for examples 1 and 3-7

The isocyanate prepolymers are prepared in a known manner by heating the starting components (relatively high molecular weight polyhydroxyl compounds, optionally low molecular weight polyols, optionally polyols containing tertiary nitrogen and polyisocyanates) for about 1 to 3 hours in a stirrer apparatus at temperatures of about 70° to 90° C. until approximately the calculated isocyanate content has been obtained. (For composition, see Table 1).

(A1b) Preparation of the isocyanate prepolymer, fully continuous process for Example 2

The dehydrated mixture of straight chained and branched hydrophobic polyether polyols (for composition see Table 1) heated to a temperature of about 90° to 110° C. and the mixture of toluylene diisocyanate isomers which has been left at room temperature are combined in a continuous flow mixer, i.e. a high speed spined stirrer mixer having spines in the stator and rotor. The components are left together in the apparatus for an average dwell time of about 20 seconds to undergo a highly exothermic polyaddition reaction so that the isocyanate content obtained at the end of this reaction is below 7.5% by weight, and preferably below 6.5% by weight. The reaction mixture is then directly introduced into the inlet opening of a double paddle screw trough by means of two parallel spray heads each having about 100 apertures measuring 1 mm in diameter (see general method of procedure A3). In this trough, the reaction mixture is immediately combined with the other components (see Table 2) to form the highly filled polyurethane urea carrier material according to the invention within a period of about 3 minutes at 80° to 90° C. The reaction is then substantially completed.

Polyether Polyols:

PHILV=hydrophilic, branched chain polyethers started on trimethylol propane and reacted with 40 parts of propylene oxide and 60 parts of ethylene oxide, OH number 26.

PHOBV=hydrophobic, branched chain polyether started on trimethylol propane and reacted with 80 parts of propylene oxide followed by 20 parts of ethylene oxide, OH number 28.

PHOBL=hydrophobic, straight chained polyether from butane-1,4-diol and propylene oxide, OH number 56.

Compounds Containing Tertiary Nitrogen:

NM=N-methyl-diethanolamine

Stabilizing Agent (Partial Salt Formation):

SS=concentrated sulphuric acid.

(A2) Conversion of the isocyanate prepolymers to the carrier masses (general method of procedure for the discontinuous process)

The prefabricated foam parts and/or fillers are suspended in the given quantity of water or the water is stirred into the foams/fillers. The isocyanate prepolymer is then rapidly added and stirred in. If the isocyanate prepolymer is highly hydrophilic, the reaction mixture solidifies at room temperature (within a few minutes, e.g. 1 to 3 minutes) whereas in the case of hydrophobic isocyanate prepolymers solidification occurs only after 1 to 8 hours. The reaction time may be reduced to 1-2 minutes by the addition of from 0.1 to 0.5% by weight of catalyst, based on the quantity of prepolymer, and/or the use of hot water (about 80° to 90° C.). The reaction is carried out in conventional stirrer apparatus (on a laboratory scale). For commercial quantities, it is preferable to use horizontally placed, conventional mixing apparatus equipped with mixing tools in the form of plough shares.

For anion formation, the calculated quantity of anion groups or compounds capable of forming anions is added to the prepolymer or to the aqueous mixture of fillers where the anion groups are not already contained in the prepolymer.

According to a special embodiment, hydrophobic isocyanate prepolymers may be emulsified in water with a very rapidly reacting diamino sulphonate, for example using a continuous flow mixer, and combined within a few seconds with the filler and/or the foam particles.

The carrier masses according to the invention prepared as described above sediment completely in water but the time taken varies according to the composition.

TABLE 1

| | Composition and characterization of the isocyanate prepolymers (PP) | | | | | | | |
|---|---|---|---|---|---|---|---|---|
| | Viscosity | % | Isocyanate | | Polyether polyol | | | |
| Type | mPa.s/25° C. | NCO | quantity | type | quantity | type | NM | SS |
| IPP | 2,600 | 6.0 | 15.1 | TDI | 84.9 | PHILV | — | |
| OPP | 2,400 | 5.9-7.5 | 15.3 | TDI | 46.2 | PHOBV | — | |
| | | | | | 38.5 | PHOBL | | |
| BOPP* | 15,600 | 5.7 | 20.6 | TDI | 76.3 | PHOBV | 3.1 | 0.2 |

*contains 260 milli-equivalents of tertiary nitrogen per 1,000 g of BOPP
Type = characterization of the isocyanate prepolymers (PP)
B = basic with tertiary nitrogen, capable of cation formation
I = hydrophilic
O = hydrophobic
(quantities given in parts by weight)

The quantities in Table 1 are given in parts by weight. Isocyanates used:
TDI=80:20 isocymeric mixture of toluylene-2,4- and -2,6-diisocyanate (A3) General method of procedure for the continuous process The apparatus used is a double paddle screw trough having a capacity of about 180 liters and a length of about 300 cm, equipped with a heating jacket for hot water or steam, with the paddle shafts rotating in opposite directions. The product is forcibly transported from the inlet opening towards the outlet opening and the reaction mixture is subjected to a certain kneading or squeezing action between the paddle shafts. The size reduced polyurethane foam and the fillers and other additives are preferably introduced separately into the screw trough by way of dosing screws. The water is introduced by means of reciprocating pumps and the isocyanate prepolymer is introduced at the same location by means of gear pumps. Hydrophobic isocyanate prepolymers, as described above, should be vigorously mixed in their anionic form with about twice their quantity of water at about 10° to 25° C. in a continuous flow mixer or static mixer within 2 to 5 seconds because the fillers, in particular pre-dried lignite powder or active carbon, are thereby wetted extremely rapidly and uniformly with the separately added residual quantity of water (optionally heated to 90° C.). The isocyanate prepolymers envelop the solids and foams uniformly and in a very finely divided form and bind them.

A dwell time of about 1 to 8 minutes in the screw trough is in most cases sufficient and the time is preferably adjusted to about 2 minutes. The material optionally prepared with the aid of catalysts and/or at an elevated temperature, is discharged through an opening situated at the bottom of the end of the trough and may then be washed immediately and may be suspended in water at any time thereafter or sprayed with water for complete swelling.

(A4) Comparison examples (not according to the invention)

Isocyanate prepolymers (for composition see Table 1) are reacted in excess quantities of water but without the use of foams or other fillers to form polyurethane ureas.

(a) Use of hydrophilic, anionic isocyanate prepolymers

When hydrophilic, anionic isocyanate prepolymers or isocyanate prepolymers which have been at least partially chain lengthened with a diamino sulphonate are stirred at room temperature with 0.5 to 5 times their weight of water, an aqueous suspension is first obtained, from which a foam gel having a closed cell structure is obtained within a period of 10 seconds to 2 minutes. When this foam gel is size reduced, it still floats in water after weeks of storage (i.e. it will not settle and therefore cannot be used as carrier by the flow or fluidized bed technique, for example for the biological purification of waste water). At 50° C. and higher temperatures, foam-gel formation proceeds even more rapidly and the proportion of closed cells is even greater, which means that the product is even more unsuitable for use.

(b) Use of hydrophobic, anionic isocyanate prepolymers or isocyanate prepolymers capable of being anionized When introduced into 2 to 5 times their quantity of water, the anionic, hydrophobic isocyanate prepolymers react considerably more slowly at room temperature and can initially be finely suspended in water although marked streakiness occurs within 1 to 2 minutes, followed very rapidly by the formation of sticky agglomerates.

At temperatures of 50° C. and above, the formation of agglomerates occurs within 20 seconds.

(c) Use of Hydrophobic, non-ionic isocyanate prepolymers

When a large excess of water is used, dispersion of the isocyanate prepolymers is not possible and the prepolymers solidify immediately at room temperature to a more or less sticky mass which gradually hardens.

EXAMPLE 1

Carrier Mass 6.68 parts by weight of a flexible foam granulate WSB-14 and 11.05 parts by weight of a native lignite from the brown coal area of Aachen (which has a residual moisture content of 9% after thorough dehydration by heat and has been broken down into particles below 100 μm so that it is in the form of lignite powder) are stirred in 80 parts by weight of water at 18° C. containing, in solution, 0.08 parts by weight of diaminosulphonate of the formula

$H_2N \cdot CH_2 \cdot CH_2 \cdot NH \cdot CH_2 \cdot CH_2 \cdot SO_3 \cdot Na$ hereinafter referred to as AAS. The mixture is then stirred with 3.2 parts by weight of isocyanate prepolymer by the general method of preparation $A_2$ indicated above (see Table 1). The carrier material obtained is in the form of a slightly elastic solid which has been swelled in water and has a moist feel. This solid is to a large extent left in lumps measuring less than 12 mm and generally need not be broken down into smaller pieces. The solid anionic polyurethane (urea) carrier material filled with foam and lignite contains 50.2 g of dry lignite substance and 33.4 g of foam in 100 g of carrier mass, calculated as the anhydrous form (made up of supposedly anhydrous lignite, foam and polyurethane ureas assumed to be anhydrous). The carrier material therefore contains 83.6% of foam plus lignite, based on the dry mass of filled polyurethane (urea) carrier.

Excess water is added to the carrier material obtained, the material is left to swell completely in water for 24 hours (at room temperature) and any supernatant water present is decanted off. The value obtained, giving the percentage by weight of water in and between the swelled carrier (polyurethane urea containing filler) is the water absorbability (WAF).

In Example 1, for example, the dry substance content of 1 liter of the suspension without supernatant water amounts to 96 g of solid substance. If the weight of the suspension is 1015 g per liter of suspension, the suspension factor is found to be F4=1015/96=10.6. One part by weight of dry substance of carrier mass is thus converted into the swelled suspension described with 9.6 times its quantity of water. This means that the water absorbability is 9.6 divided by 10.6 multiplied by 100=90.3%.

The bulk densities S1 to S3 (in g/l) are then determined to further characterize the carrier masses.

In the example given above, the values S1 to S3 have the following meanings:
S1: 531 g/l,
S2: 322 g/l,
S3: 136 g/l.

The values of the volume, crush and swelling factors F1 to F3 from Example 1 are summarized in Tables 2 and 3.

Characteristic of the foam used as filler:

Mixtures of waste foam have various densities (from about 15 to about 110 kg/m$^3$) obtained from the large scale commercial production of polyether-polyurethane block foam and molded foam were used:

WSB-14:

The dry bulk density of the flexible foam consisting predominantly of block foam waste is about 14 g/l. Particle size: 1 mm to 12 mm; bulk densities after suspension in water, S1: 263 g/l; S2: 101 g/l; S3: 14 g/l; TS-S (dry substance content in aqueous suspension): 12.5 g/liter of suspension.

Comparison experiments:

Foams having the usual gross densities are completely unusable for biological waste water purification since they float to the top.

When a comparison experiment was carried out in a stirrer apparatus, using a uniform flexible block foam having a relatively high density (bulk density 36 g/l; unit weight 90 g/l) broken down to particles measuring below 12 mm, it was found that even after 3 months storage in water, most of the material immediately floated to the top when stirring was briefly interrupted. The application of a fluidized bed was not possible with this foam since it floats to the top, apart from being brittle and subject to abrasion.

Preparation of the carrier material according to the invention (detailed description of process A2):

The highly filled polyurethane (urea) masses used in Examples 1 and 3 to 7 were prepared by a discontinuous method at approximately room temperature, either using a high-speed mixer consisting of a cylindrical container obliquely mounted on a rotatable plate and equipped with an eccentric stirrer rotating in the opposite sense to the plate, or using horizontally mounted mixers equipped with ploughshare stirrers. The size reduced polyurethane foam waste and the required quantity of water are introduced into the apparatus. The filler, e.g. lignite, is then uniformly mixed into the contents and diaminosulphonate is also optionally added. The measured quantity of isocyanate prepolymer is then introduced in fine jets by means of a gear pump. The isocyanate prepolymer may previously have been mixed with the diol dulphonate to form an aqueous emulsion. Stirring is stopped a few minutes after all the components have been mixed, and the carrier material is spread out in layers about 10 to 30 cm in height for a period of 10 to 90 minutes until the isocyanate reactions have been substantially completed.

The carrier material may be washed several times with water if required and is then ready for immediate use or may be used at a later date.

The composition of the carriers according to Examples 1 to 7 are indicated in Table 2.

Properties of the carrier masses according to the invention according to Examples 1 to 7 (see Table 3).

Examples 1 to 7 (see Table 2)

Highly filled, slowly sedimenting polyurethane (urea) masses with or without flexible polyurethane foam waste, additional fillers, isocyanate compounds and diaminosulphonate AAS:

For method of preparation, see e.g. Example 1; for composition of the isocyanate prepolymers used, see Table 1; for quantitative proportions used in the reaction and for results see Tables 2 and 3.

The anionic PUR(HS) mass already described in some detail in Example 1 was again included in Tables 2 and 3 for the sake of clarity.

TABLE 2

Composition of the highly filled polyurethane (polyurea) carrier masses for Examples 1 to 7 (discontinuous method of preparation according to A)2, except in Example 2 where the continuous method according to A)3 was used).

| | Fillers | | | | | | Isocyanate prepolymer | | | |
|---|---|---|---|---|---|---|---|---|---|---|
| | (Waste) foam | | | Other Fillers | | | | | | |
| Examples | Quantity | Type | Mesh size (mm) | Quantity | Type | Mesh size ($\mu$m) | Quantity | Type | % Isocyanate content | Quantity of water | Temp °C. |
| 1 | 6.68 | WSB-14 | 12 | 10.4 | BK | 100 | 3.2 | IPP | 6.0 | 80 | 40 |
| 2 | 14.50 | WSB-14 | 12 | 25.0 | BK | 100 | 10.0 | OPP | 5.9 | 50 | 55 |
| 3 | 15.00 | WSB-14 | 6 | 9.6 | BK | 100 | 7.5 | OPP | 5.9 | 50 | 45 |
| | | | | 17.5 | Fe 1 | | | | | | |
| 4 | 14.50 | WSB-14 | 12 | 15.0 | BKK | 100 | 6.7 | OPP | 5.9 | 50 | 80 |
| | | | | 10.0 | BK | | 3.3 | BOPP | 5.5 | | |
| 5 | none | | | 32 | BK | 100 | 8.0 | IPP | 6.0 | 60 | 65 |
| 6 | 10.26 | WSB-14 | 12 | 9.0 | AK | 10 | 10.23 | OPP | 6.0 | 70 | 50 |
| 7 | 10.36 | WSB-14 | 12 | 9.0 | AK | 10 | 10.23 | IPP | 5.9 | 70 | 50 |

| | | | Bulk densities | | |
|---|---|---|---|---|---|
| Examples | Addition Quantity AAS | Dry substance (g/l) of suspension (TS-S) | After water has dripped off S1 | After water has been squeezed out S2 | Dried S3 |
| 1 | 0.05 | 96 | 531 | 322 | 136 |
| 2 | 0.50 | 66 | 370 | 239 | 77 |
| 3 | 0.40 | 68 | 313 | 181 | 85 |
| 4 | 0.50 | 60 | 371 | 218 | 77 |
| 5 | 0.40 | 98 | 643 | 635 | 312 |
| 6 | 0.51 | 67 | 554 | 284 | 79 |
| 7 | 0.51 | 66 | 508 | 407 | 98 |

TABLE 3

Volumetric, squeezing and swelling factors of the highly filled polyurethane (urea) carrier masses (Examples 1-7)

| Example | F1 Volumetric factor | F2 Squeezing factor | F3 Swelling factor | F4 Suspenson factor | % WAF Water absorbability | Solids content, % |
|---|---|---|---|---|---|---|
| 1 | 5.5 | 3.4 | 3.8 | 10.6 | 90.3 | 9.7 |
| 2 | 5.6 | 3.6 | 3.8 | 15.4 | 93.6 | 6.4 |
| 3 | 4.6 | 2.7 | 3.1 | 15.1 | 93.2 | 6.8 |
| 4 | 6.2 | 3.6 | 3.8 | 17.0 | 94.1 | 5.9 |
| 5 | 6.6 | 6.5 | 4.2 | 10.5 | 90.5 | 9.5 |
| 6 | 8.3 | 4.2 | 5.4 | 15.3 | 93.5 | 6.5 |
| 7 | 7.7 | 6.1 | 6.2 | 15.4 | 93.5 | 6.5 |
| Average value x = | 6.4 | 4.3 | 4.3 | 14.2 | 92.7 | 7.3 |
| Lower to upper limit | 4.6–8.3 | 2.7–6.5 | 3.1–6.2 | 10.5–17.0 | 90.3–93.6 | 5.9–9.7 |

Tables 2 and 3 continued

Quantities given in parts by weight, based on the solids content.

BK = lignite, tempered, with a residual moisture content of 9% by weight (in parts by weight of dry substance)
BKK = lignite coke
AK = active carbon, 50% below 4 μm
I = non-ionic hydrophilic NCO prepolymer
O = non-ionic hydrophobic NCO prepolymer
BO = cation-forming hydrophobic NCO prepolymer
Fel = ferromagnetic iron oxide ($Fe_3O_4$), particle size about 1 μm

(B) USE OF THE CARRIER MASSES IN BIOLOGICAL PURIFICATION PROCESSES (ACCORDING TO THE INVENTION)

(B1) Characterization of the Biological Fixed Bed/Fluidized Bed Apparatus Employed (See FIG. 1)

(I) Description of a continuously operating fixed bed apparatus (see FIG. 1), Process I The process in the fixed bed apparatus is referred to as Process Ia) and the process in the fluidized bed apparatus as Process Ib).

A partial stream of the discharge from a first activation stage of a large scale industrial plant having CSB values of 350±100 mg/l, occasionally +250 mg/l, and $BSB_5$-values of 23±5 mg/l, occasionally ±15 mg/l, is continuously pumped into column (3) through pipe (2) from pump (1). Carrier material (4) which is to be colonized by the activated sludge biomass is introduced into the column.

The gas required for gassing and supply of oxygen to column (3) is delivered to the column through the rotameter (5) by way of pipe (6) fitted with a frit or perforated plate (7). The column may be operated as a fluidized bed by supplying large quantities of oxygenated gas or as a fixed bed if the gas supply is low. The oxygen-containing gas passes through the frit or perforated plate (7) in the form of small bubbles and flows through column (3). The effluent water supplied through pipe (2) also flows through the column (3) to leave through the discharge (8), and a biological layer forms on the column filling (4) within a few days when carrier materials according to the invention are used. The treated effluent water is introduced into a clarifier (9) by way of the pipe (8) after an average dwell time of 4 hours. Particles of the biological layer which have been flushed out of the column (3) settle in the clarifier (9) and can be discharged through the stopcock (10). The clarified effluent water leaves the clarifier (9) through the discharge pipe (11). Total volume of apparatus: 100 liters; degree of filling with carrier material according to the invention: 65 vol.-%. The average dwell time of the effluent water is 4 hours.

Figure 2:
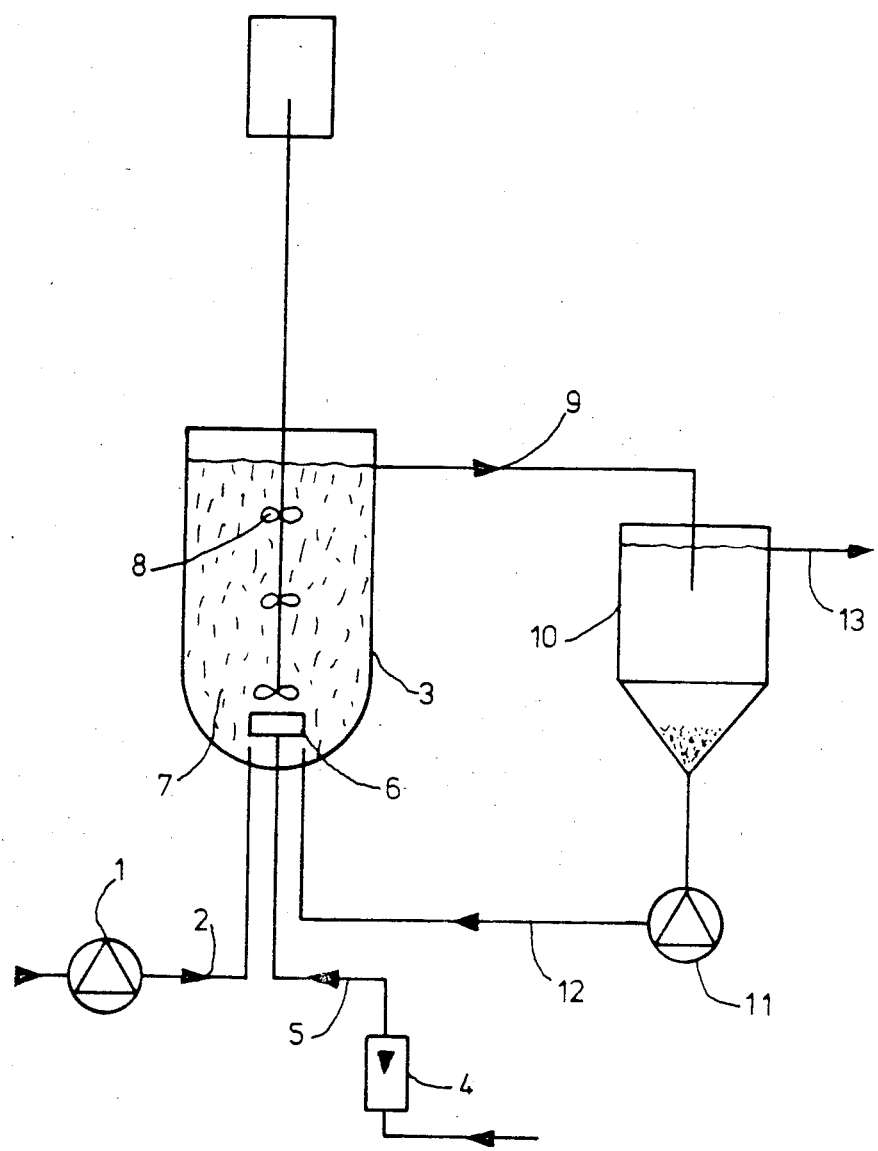

(II) Description of a continuously operating stirrer apparatus (FIG. 2) (fluidized bed process)

A partial stream of the discharge from a first activation stage of a large scale industrial plant (CSB 300–400 mg/l, $BSB_5$ 18–27 mg/l) is continuously pumped into the container (3) by the pump (1) by way of the pipe (2). Oxygenated gas is supplied to the container (3) by way of the rotameter (4) and the pipe (5) with frit (6). The effluent water to be treated and the carrier material (7) on which the bacteria are required to grow are kept in motion by the stirrer (8) to ensure uniform distribution of the carrier material and of the activated sludge. The gas passing through the frit (6) in fine bubbles is distributed in the container (3) by the stirrer (8) so that the contents of the container may be adequately supplied with oxygen. The treated water overflowing from container (3) is transferred to the clarifier (10) through the pipe (9). Activated sludge (7) rinsed out of the container (3) and settling in the clarifier (10) may be either returned to the container (3) by way of the pump (11) and pipe (12) or removed from the cycle. The clarified effluent water leaves the clarifier (10) through the pipe (13). The continuous purification in the 50 liter stirrer apparatus (filling volume 65% by weight) is referred to in the Examples as purification process II. The average dwell time of the effluent water is 4 hours. The degradation results are average values taken in each case from four analyses in the second to third week after onset of the biological purification of effluent water.

Examples 8 to 11

Results of aerobic biological waste water purification

|  | Blank test | Example No. | | | |
|---|---|---|---|---|---|
| Example |  | 8 | 9 | 10 | 11 |
| Method of biological purification | I | I | II | I | I |
| Carrier mass from Example No. | no carrier | 1 | 2 | 6 | 7 |

-continued

|  | Blank test | Example No. | | | |
| --- | --- | --- | --- | --- | --- |
| CSB degradation | 435 | 229 | 204 | 243 | 256 |
| Daphnia toxicity at dilution 1: | 3500 | 410 | 160 | 430 | 520 |
| Odor threshold at dilution 1: | 1400 | 530 | 380 | 560 | 580 |
| Lightening of color (transmission at nm 600 | 48 | 85 | 89 | 83 | 81 |
| 500 | 34 | 76 | 81 | 73 | 72 |
| 400 | 18 | 55 | 60 | 53 | 51 |

The blank test is an experiment of biological waste water purification carried out at the same time under the same conditions as in the Examples but without the addition of the highly filled polyurethane (urea) carrier masses. For the method of biological purification, see Process I fixed bed method and Process II flow and fluidized bed method.

EXAMPLE 12

Waste water from chlorine bleaching of a sulfite cellulose factory, with a CSB value of 3860 mg//l was subjected in parallel and continuously operating plants to anaerobic microbial treatment.

The trials were performed in 1.6 liter capacity anaerobic arrangement, as described by W. J. Jewell in "Journal of the Water Pollution Control Federation," Vol. 53, No. 4, p. 484, (FIG. 1b). Average hydraulic residence time of the waste water in the reactor was 3.33 days. The decomposition trials were performed in the following variations:

Arrangement 1 (blank test without carrier as comparison)
400 suspended cells
Arrangement 2 (according to the invention)
400 ml suspended cells and
400 ml anionic modified, highly filled PUR carrier mass of Example 1.

The cells were taken from the anaerobic reactor from a sugar factory.

After the equilibrium conditions in the reactor were reached (after 34 days), the following results were obtained:

Arrangement 1: CSB-value in discharge 2010 mg/l
Arrangement 2: CSB-value in discharge 802 mg/l Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of filler-containing polyurethane (urea) compositions comprising reacting:
   (A) at least one di- and/or polyfunctional isocyanate-terminated prepolymer having an isocyanate group content of from 1 to 12% by weight,
   (B) from 0 to 50% by weight based on the weight of (A) of a lower molecular weight organic di- and/or polyisocyanate, with the mixture of (A) and (B) having anisocyanate group content of 30% by weight or less.
   (C) a stoichiometric excess quantity of water, and
   (D) from 0 to 50 equivalent % based on the total isocyanate equivalents in (A) and (B) of a member selected from the group consisting of
      (i) organic di- and/or polyamines,
      (ii) organic compounds containing at least one group which is reactive with an isocyanate group and at least one anionic group or group capable of forming an anionic group, and
      (iii) mixtures thereof, in the presence of
   (E) from 5 to 97% by weight of fillers selected from the group consisting of
      (i) finely divided or lumpy foam particles,
      (ii) fossil lignocelluloses,
      (iii) carbon powder, and
      (iv) mixtures thereof, said % by weight of component (E) being based on the total moisture-free weight of components (A), (B), (D) and (E),
said filler-containing polyurethane (urea) having a water absorbability of from 33 to 97% by weight, and having an anionic group content of from 10 to 3000 milliequivalents of anionic groups and/or groups capable of anionic group formation per 1000 grams of components (A), (B) and (D).

2. The process of claim 1, wherein the anionic group content of said filler-containing polyurethane (urea) is supplied via component (A), via component (D), or both component (A) and component (D).

3. The process of claim 1, wherein said component (A) is prepared by reacting
   (a) organic materials having two or more hydrogen atoms which are reactive with isocyanate groups and having molecular weights of from 400 to 10,000,
   (b) from 0 to 5 moles per mole of (a) of materials having two or more hydrogen atoms which are reactive with isocyanate groups and having molecular weights of from 32 to 399,
   (c) organic di- and/or polyisocyanates.

4. The process of claim 3, wherein said component (A) is prepared by reacting (a), (b), (c) and
   (d) an organic compound containing
      (i) either at least one hydrogen atom which is reactive with an isocyanate group or at least one isocyanate group and
      (ii) at least one anionic group or group capable of anionic group formation.

5. The process of claim 3 wherein said component (b) has a molecular weight of from 62 to 254.

6. The process of claim 3, wherein said component (b) is a di- and/or polyol.

7. The process of claim 1, wherein said component (A) has an isocyanate functionality of 2.1 or more.

8. The process of claim 1 wherein said component (C) is used in an amount of at least 0.5 times the weight of components (A) and (B).

9. The process of claim 8, wherein said component (C) is used in an amount of from 2 to about 60 times the weight of components (A) and (B).

10. The process of claim 1 wherein component (E) comprises polyurethane foam particles.

11. The process of claim 1 wherein component (E) comprises powdered lignite and/or peat.

12. The process of claim 1 wherein component (E) comprises active carbon and/or lignite coke.

13. The process of claim 1 wherein component (E) comprises polyurethane foam particles and either finely divided lignite or peat.

14. The process of claim 13 further including carbon powder.

15. The process of claim 1 wherein organic compounds containing at least one hydrogen atom which is reactive with an isocyanate group and at least one anionic group or group capable of anionic group formation is used in the preparation of said component (A).

16. The process of claim 15 wherein said organic compound is selected from the group consisting of diol sulphonates, diol carboxylic acids, and diol carboxylates, and wherein said filler-containing polyurethane (urea) has an anionic group content of from 30 to 1500 milliequivalents per 1000 grams of components (A), (B) and (D).

17. The process of claim 16 wherein component (D)(ii) is selected from the group consisting of diaminosulphonic acids, diaminocarboxylic acids, and the alkali metal, ammonium or amine salts thereof.

18. The process of claim 1 wherein component (D)(ii) is selected from the group consisting of diaminosulphonic acids, diaminocarboxylic acids, and the alkali metal, ammonium or amine salts thereof.

19. The process of claim 3, wherein component (a) is a polyether polyol containing less than 20% by weight of oxyethylene groups.

20. The filler-containing polyurethane (urea) produced according to the process of claim 1.

* * * * *